United States Patent
Mino et al.

(10) Patent No.: US 7,604,887 B2
(45) Date of Patent: Oct. 20, 2009

(54) ELECTROLYTE MEMBRANE, MEMBRANE ELECTRODE ASSEMBLY USING THIS AND FUEL CELL

(75) Inventors: Norihisa Mino, Nara (JP); Nobuhiko Hojo, Neyagawa (JP); Aoi Tanaka, Osaka (JP); Takashi Akiyama, Minoo (JP); Yukihiro Okada, Katano (JP); Kohji Yuasa, Hirakata (JP); Yuu Inatomi, Moriguchi (JP); Taisuke Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 848 days.

(21) Appl. No.: 10/521,871

(22) PCT Filed: Jul. 24, 2003

(86) PCT No.: PCT/JP03/09368

§ 371 (c)(1),
(2), (4) Date: Jan. 21, 2005

(87) PCT Pub. No.: WO2004/019439

PCT Pub. Date: Mar. 4, 2004

(65) Prior Publication Data

US 2005/0260478 A1 Nov. 24, 2005

(30) Foreign Application Priority Data

Jul. 25, 2002 (JP) ............................. 2002-217247

(51) Int. Cl.
H01M 8/10 (2006.01)
(52) U.S. Cl. .......................................... 429/34; 429/33
(58) Field of Classification Search ................... 429/33, 429/34
See application file for complete search history.

(56) References Cited

U.S. PATENT DOCUMENTS

| | | | |
|---|---|---|---|
| 5,094,895 A | 3/1992 | Branca et al. | |
| 5,213,910 A * | 5/1993 | Yamada | 429/32 |
| 5,260,143 A | 11/1993 | Voss et al. | |
| 5,773,162 A | 6/1998 | Surampudi et al. | |
| 6,447,943 B1 | 9/2002 | Peled et al. | |
| 2003/0175569 A1 | 9/2003 | Inagaki et al. | |

FOREIGN PATENT DOCUMENTS

| | | |
|---|---|---|
| EP | 1 202 365 | 5/2002 |
| JP | 6-29032 | 2/1994 |
| JP | 7-48459 | 2/1995 |
| JP | 11-339827 | 12/1999 |
| JP | 2001-155744 | 6/2001 |

(Continued)

*Primary Examiner*—Patrick Ryan
*Assistant Examiner*—Karie O'Neill
(74) *Attorney, Agent, or Firm*—Hamre, Schumann, Mueller & Larson, P.C.

(57) ABSTRACT

The electrolyte membrane of the present invention is an electrolyte membrane (1) having ionic conductivity that includes a base material (2) and organic molecules having ion exchange groups, wherein the organic molecules are chemically bonded to the surface of the base material (2) to form an organic layer (3), and ions are conducted via the ion exchange groups in the organic layer (3). By providing this type of electrolyte membrane, it is possible to obtain an electrolyte membrane having ionic conductivity whose configuration is different to that of a conventional electrolyte membrane.

30 Claims, 16 Drawing Sheets

FOREIGN PATENT DOCUMENTS

| | | | |
|---|---|---|---|
| JP | 2002-83612 | | 3/2002 |
| JP | 2002083612 A | * | 3/2002 |
| JP | 2002-203576 | | 7/2002 |
| JP | 2002203576 A | * | 7/2002 |
| WO | 96/12317 | | 4/1996 |

* cited by examiner

ELECTROLYTE MEMBRANE, MEMBRANE ELECTRODE ASSEMBLY USING THIS AND FUEL CELL

TECHNICAL FIELD

The present invention relates to electrolyte membranes, and to membrane electrode assemblies and fuel cells using these membranes.

BACKGROUND ART

In recent years, the development of fuel cells has thrived due to a focus on saving energy and reducing emissions. Fuel cells can be classified into, for example, phosphoric acid, alkali, molten carbonate, solid oxide and polymer electrolyte (also known as PEFC) types, according to the type of electrolyte membranes they use. Of these, PEFC has such characteristics as being able to operate at low temperatures and having a high power output density, and its commercial application in uses such as a power source for automobiles, and in household co-generation systems is advancing.

Conventionally, the electrolytes (polymer electrolytes) used in PEFC have generally been electrolyte membranes (PFSA membranes) made from polyperfluorocarbon sulfonic acid (for example Nafion® made by DuPont). However, there are a number of problems with PFSA membranes, including those made from Nafion.

High manufacturing cost is one example. The perfluoro monomer used as the raw material is expensive, and it also seems that this high manufacturing cost is caused by the greater number of steps (procedures) required for polymer and film formation and the like processes, when compared to the process of manufacturing generic polymers. Thus, the proportion of the material cost of the entire fuel cell occupied by the cost of the electrolyte membrane is very large, and this is a large impediment to the popularization of fuel cells. At present, various measures are being carried out in respect of this problem, and there are advancements in the development of lower cost polymer electrolyte membranes in which the principal component is hydrocarbon. However, it is very difficult to manufacture low cost polymer electrolyte membranes that have an equivalent ionic conductivity and durability to PFSA membranes such as Nafion, and these have not led to a fundamental solution.

DISCLOSURE OF INVENTION

In consideration of this situation, it is an object of the present invention to provide an electrolyte membrane that has a structure that differs from conventional electrolyte membranes, and to provide a membrane electrode assembly (MEA) and a fuel cell that use this membrane.

The electrolyte membrane of the present invention is an electrolyte membrane having ionic conductivity, the electrolyte membrane comprising a base material, and organic molecules containing ion exchange groups, wherein the organic molecules are chemically bonded to the surface of the base material to form an organic layer, and wherein ions are conducted via the ion exchange groups in the organic layer.

In the electrolyte membrane of the present invention, the ion exchange groups include at least one type of functional group selected from phosphonyl, phosphinyl, sulfonyl, sulfinyl, carboxyl, phosphone, phosphine, sulfone, sulfine, mercapto, ether bonding, nitro, hydroxy, quaternary ammonia, amino and phosphoric acid groups.

In the electrolyte membrane of the present invention, the molecular weight of the organic molecules is 10,000 at most.

In the electrolyte membrane of the present invention, the organic molecules are chemically bonded to the surface of the base material by a coupling agent.

In the electrolyte membrane of the present invention, at least one of the organic molecules is chemically bonded to an adjacent organic molecule.

In the electrolyte membrane of the present invention, the thickness of the organic molecule membrane is in a range of at least 0.1 nm to at most 500 nm.

In the electrolyte membrane of the present invention, the organic molecule membrane is a monolayer.

In the electrolyte membrane of the present invention, the organic layer is a bilayer or multilayer that includes a structure in which a plurality of monolayers are built-up.

In the electrolyte membrane of the present invention, the base material has at least one form selected from particles or fibres, and wherein the electrolyte membrane includes an amalgamation of the base material.

The electrolyte membrane of the present invention further includes a porous membrane, wherein the base material has at least one form selected from particles or fibres, and wherein the electrolyte membrane includes a structure in which the base material is disposed in an inner portion of the holes of the porous membrane.

In the electrolyte membrane of the present invention, the base material has a folded film shape.

In the electrolyte membrane of the present invention, a surface of the base material and the surface of the electrolyte membrane are perpendicular to each other.

In the electrolyte membrane of the present invention, the base material is wound.

In the electrolyte membrane of the present invention, the base material is folded into an accordion shape.

In the electrolyte membrane of the present invention, the base material is a porous membrane.

In the electrolyte membrane of the present invention, a plurality of through holes that pierce the porous membrane in the direction perpendicular to the membrane surface are formed in the porous membrane; and the organic molecules are chemically bonded to the inner surface of the through holes, to form the organic layer.

In the electrolyte membrane of the present invention, the cross-sectional area of the through holes that are cut in a direction that is parallel to the surface of the porous membrane changes in the thickness direction of the porous membrane.

In the electrolyte membrane of the present invention, fine holes that are connected to the through holes are further formed in the porous membrane, and both ends of the fine holes are open ended.

In the electrolyte membrane of the present invention, both ends of the fine holes are connected to the through holes.

In the electrolyte membrane of the present invention, one end of the fine holes is connected to the through holes and the other end of the fine holes is connected to the surface of the porous membrane.

In the electrolyte membrane of the present invention, the base material includes at least one type of material selected from metal, metal oxide, glass, ceramic, clay, carbon, resin and silica.

In the electrolyte membrane of the present invention, the base material includes at least one type of material chosen from an oxide of a transition metal, alumina, fluorocarbon resin, aramid resin, silicone resin, amide resin, imide resin and melamine resin.

In the electrolyte membrane of the present invention, includes a plurality of base materials.

In the electrolyte membrane of the present invention, the specific surface area per unit volume of base material, measured by gas adsorption method, is at least $100 \text{ m}^2/\text{cm}^3$.

In the electrolyte membrane of the present invention, when the porosity of the base material is $\epsilon$ (volume %) and the average diameter of the through holes is d (nm), $\epsilon$ and d satisfy the relationship given by $(4 \times \epsilon)/d > 10$.

In the electrolyte membrane of the present invention, when the porosity of the base material is $\epsilon$ (volume %), and the average ratio of curvature of the through holes is $\tau$, $\epsilon$ and $\tau$ satisfy the relationship given by $\epsilon/\tau^2 < 20$.

In the electrolyte membrane of the present invention, so as to fill gaps present in the inner portion of the through holes, a substance further is provided on the face of the membrane on the side opposite the face that is bonded to the base material, in the organic layer.

In the electrolyte membrane of the present invention, the substance is water-repellent.

In the electrolyte membrane of the present invention, the substance is a polymer of at least one type of material selected from organic material and inorganic material.

Next, the membrane electrode assembly of the present invention includes an electrolyte membrane according to claim 1, a cathode electrode; and an anode electrode, wherein the electrolyte membrane is disposed between the cathode electrode and the anode electrode.

Next, the fuel cell of the present invention includes an electrolyte membrane according to claim 1, a cathode electrode and an anode electrode, wherein the electrolyte membrane is held between the cathode electrode and the anode electrode, and further includes a fuel supply portion to supply fuel to the anode electrode, and an oxidizing agent supply portion to supply an oxidizing agent to the cathode electrode.

In the fuel cell of the present invention, the fuel includes at least one type of gas or liquid selected from hydrogen and hydrocarbon.

In the fuel cell of the present invention, the fuel includes methanol.

BEST MODE FOR CARRYING OUT THE INVENTION

Embodiments of the present invention are explained below with reference to the drawings. It should be noted that in the following embodiments, similar parts are given similar symbols, and duplicate descriptions may be omitted.

First, an electrolyte membrane of the present invention is described.

Figure 1:
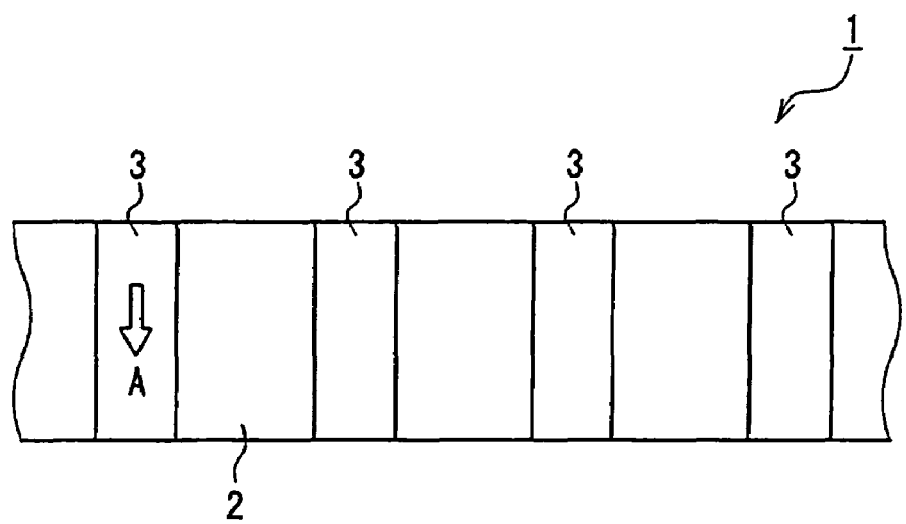
FIG. 1 is a schematic view showing an example of an electrolyte membrane of the present invention.

FIG. 1 is a diagram that schematically shows an example of the electrolyte membrane of the present invention. An electrolyte membrane 1 shown in FIG. 1 is an electrolyte membrane having ionic conductivity, and it includes a base material 2 and organic molecules that contain an ion exchange group. The organic molecules chemically bond with a surface of the base material 2 to form an organic layer 3, and ions are conducted via the ion exchange groups in the organic layer 3.

It should be noted that in the example shown in FIG. 1, the electrolyte membrane 1 includes the base material 2 in which through holes are formed connecting both membrane surfaces (principal surface on one side and principal surface on the other side) of the electrolyte membrane 1. Furthermore, the organic molecules are chemically bonded to the inner surface of the through holes to form the organic layer 3. The electrolyte membrane of the present invention is not limited to such a configuration. Other configurations (for example, variations on the form of the base material 2, and the like) are described later. Furthermore, in order to facilitate the description of FIG. 1, hatching has been omitted. Hatching may also be omitted from the drawings to follow in a similar manner.

By providing this type of electrolyte membrane 1, it is possible to provide an electrolyte membrane that is configured in a different way from conventional membranes. Furthermore, an electrolyte membrane that has a superior degree of ionic conductance (ionic conductivity) can be provided. Furthermore, it is not necessary to user fluoropolymers, and thus it is possible to provide electrolyte membranes at a lower cost than conventional PFSA membranes. Alternatively, by including a base material, it is possible to provide an electrolyte membrane that has superior strength and/or moldability. It should be noted that these effects are optional, and it is not necessary that the electrolyte membrane of the present invention simultaneously satisfies all these effects. It is possible to select these effects by selecting, for example, the type of organic molecules included in the electrolyte membrane, the form of the base material, and the material.

In the electrolyte membrane of the present invention, the ions are conducted by the ion exchange groups contained in the organic molecules. There is no particular limitation to the overall direction in which the ions are conducted within the electrolyte membrane. The conduction direction may be set in accordance with the characteristics required for the electrolyte membrane, and can be set by choosing factors such as the shape of the base material, the type of the organic molecules and the shape of the organic layer. If it is to be used in a fuel cell, the overall direction that the ions are conducted, may, for example, be the direction connecting the two membrane surfaces of the electrolyte membrane, for example, the direction indicated by an arrow A in FIG. 1.

There is no particular limitation to the type of ion that is conducted. By selecting the ion exchange group that the organic molecules contain, any ion may be set. For example, in the electrolyte membrane of the present invention the ion exchange group may include at least one type of functional group selected from phosphonyl (—HPO), phosphinyl (—H$_2$PO), sulfonyl (—SO$_2$—), sulfinyl (—SO—), carboxyl (—COOH), phosphone (—PO(OH)$_2$), phosphine (—HPO(OH)), sulfone (—SO$_3$H), sulfine (—SO$_2$H), mercapto (—SH), ether bonding (—O—), nitro (—NO$_2$), hydroxy (—OH), quaternary ammonia (—NH$_4^+$), amino (—NH$_2$) and phosphoric acid (—PO$_4$) groups. Of these, phosphinyl, carboxyl and sulfone groups are preferable. With organic molecules containing such ion exchange groups, it is possible to provide an electrolyte membrane that favorably conducts hydrogen ions (H$^+$). Thus, it is possible to use such an electrolyte membrane in fuel cells instead of the polymer electrolyte membrane that is generally used in PEFC. Furthermore, by utilizing the ionic conductivity of hydrogen, the membrane can be used in electro-chemical elements, for example, such as various types of gas sensors, electro-chemical capacitors, secondary batteries, and primary batteries. Furthermore, since it has a high ion exchange capability, it may also be used in ion exchange membranes and acid catalysts, for example.

Furthermore, there is no particular limitation on the position of the ion exchange group within the organic molecules. For example, the ion exchange group may be disposed in the terminal position of the principal chain of the organic molecule, and it may be disposed in vicinity of the center of the principal chain. Alternatively, it may be disposed at the terminal position or in the vicinity of the center of a side chain of the organic molecule. For example, if the ion exchange group is disposed in the vicinity of the center of the principal chain, or on a side chain, it is possible to laminate (accumulate) further organic molecules on top of these ion exchange groups, and thus provide an electrolyte membrane that includes more ion exchange groups.

In the electrolyte membrane of the present invention, the molecular weight of the organic molecule may be 10,000 or less. Within this, it is preferable that the molecular weight is 5,000 or less, and it is more preferable that the molecular weight is 1,000 or less. Put another way, rather than being a polymer, it is preferable that the electrolyte membrane is a monomer, or a laminate of monomers in the order of a few layers to a few dozen layers, for example. For example, when compared to an electrolyte membrane that conducts ions via a macromolecule whose molecular weight, including the base material, is much larger than the range described above, it is possible to increase the degree of freedom of the shape of the base material, and/or raise the ionic conductivity, and/or suppress cross-over of fuel. This is because, if the base material contains through holes, for example, then by forming the organic layer using an organic molecule whose molecular weight is within the range rather than filling a polymer having ionic conductivity into the interior of the through holes, it is possible to arrange (for example, concentratedly) the ion exchange groups in a specified place. It should be noted that it is sufficient that "molecular weight" is, for example, the weight-average molecular weight. Furthermore, although there is no particular minimum limit to the molecular weight of the organic molecules, it should be 17 or greater, for example.

There is no particular limitation to the molecular length of the organic molecules, and it may be in the range of 0.1 nm to 500 nm, for example, and preferably in the range of 0.1 nm to 2 nm. Such organic molecules are thought to be more uniformly disposable on the surface of the base material. Thus, it is possible to provide an electrolyte membrane with superior ionic conductivity.

There is no particular limitation to the chemical bonding in the electrolyte membrane of the present invention, and it can be bonding of at least one type selected from among, for example, covalent bonds, ionic bonds, coordinate bonds, metallic bonds and hydrogen bonds. The organic molecules may contain active hydrogen, or may form covalent bonds with the surface of a base material thus imparted with active hydrogen. The chemical bonding also may be covalent bonds formed by elimination reaction, and it may be formed via oxygen atoms. Such bonding may be formed if a coupling agent is used as the organic molecules, and if the organic molecule is used in combination with the coupling agent, for example.

Put another way, in the electrolyte membrane of the present invention, the organic molecules may be chemically bonded to the surface of the base material by a coupling agent, and a more stable organic molecule membrane may be provided. There is no particular limitation to the coupling agent, and it may be a silane coupling agent whose terminal group includes at least one type selected from, chlorosilane, methoxysilane and ethoxysilane. Furthermore, it may, for example, be an alkyl group whose principal chain portion is a straight chain, or it may be a fluoroalkyl group. It should be noted that if it is an alkyl group whose principal chain portion is a straight chain, then the number of carbons may be in the range of 2 to 50, and is preferably in the range of 8 to 20. Furthermore, the molecular length of the silane coupling agent may be in the range of 0.5 nm to 3.8 nm for example. Thus an organic layer can be formed in which the organic molecules are more uniformly disposed on the surface of the base material, and an electrolyte membrane with superior characteristics, such as ionic conductivity, can be provided.

Furthermore, the organic molecule and the coupling agent may be the same organic molecule. That is to say, for example, the terminal group of the organic molecule may be a silane group as described above, and at the same time the organic molecule may contain an ion exchange group described above. Furthermore, even if the organic molecule does not contain the ion exchange group at the start, it may contain the ion exchange group after chemical bonding with the surface of the base material. That is to say, organic molecules that do not contain ion exchange groups may be bonded to the surface of the base material, and the ion exchange groups may be conferred later.

Figure 2:
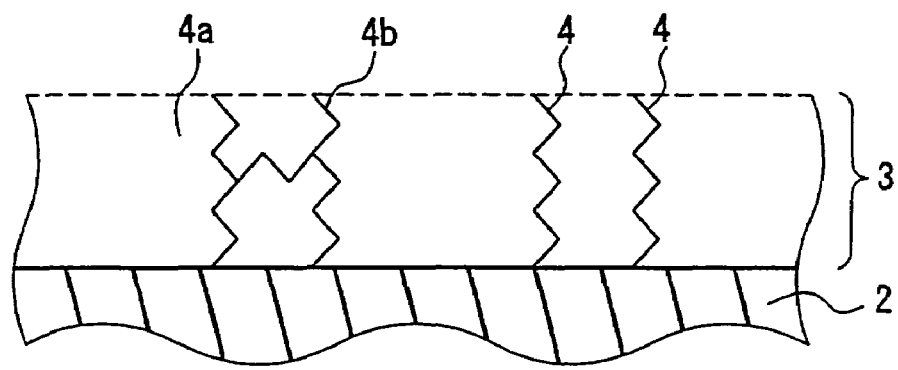
FIG. 2 is a diagram for describing an example of a state of an organic molecule in the electrolyte membrane of the present invention.

In the electrolyte membrane of the present invention, at least one organic molecule may be chemically bonded to an adjacent organic molecule. FIG. 2 is an enlarged schematic view of the surface of the base material of such an electrolyte membrane. The organic layer 3 shown in FIG. 2 includes organic molecules 4, 4a and 4b having ion exchange groups, and the organic molecule 4a and the organic molecule 4b that is adjacent to the organic molecule 4a are chemically bonded. In such a structure, it is possible to provide an organic layer 3 that has superior durability against hydrolyzation and oxidation, for example. Furthermore, it is also possible to provide an organic layer 3 whose ion exchange groups are more uniformly disposed.

Thus, bonding between adjacent organic molecules may also include bonds via side chains of the organic molecules. Furthermore, the side chains also may include alkyl groups of which some or all of its hydrogen atoms are substituted by fluorine. Thus, it is possible to provide an organic layer 3 with superior durability.

There is no particular limitation to the thickness of the organic layer, and it may be, for example, in a range of at least 0.1 nm to 500 nm at most. Within this, a range of at least 0.1 nm to 2 nm at most is preferable, and a range of at least 0.3 nm to at most 1 nm is particularly preferable. The thickness of the organic layer can be controlled by adjusting, for example, the molecular length of the organic molecules and the accumulation of the organic molecules.

In the electrolyte membrane of the present invention, the organic layer may be a monolayer. Since ion exchange groups can be substantially uniformly disposed, it is possible to provide an electrolyte membrane that has excellent characteristics, such as ionic conductivity. Furthermore, it is also possible to laminate a monolayer that includes ion exchange groups on top of the organic layer.

Figure 3A:
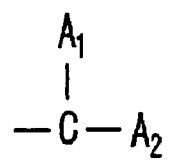
FIG. 3A to FIG. 3C are diagrams for describing an example of the organic molecule used in the electrolyte membrane of the present invention.
Figure 3B:
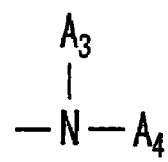
Figure 3C:
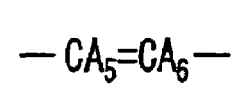

An example of the electrolyte membrane of the present invention is shown here. In the electrolyte membrane of the present invention, the organic molecule may, for example, be an organic molecule that includes an SH group, an $SiX_nY_m$ group, and at least one type of functional group shown in FIG. 3A and FIG. 3B (where X is at least one type selected from a halogen group and an alkoxy group that has 8 or less carbon atoms, and Y is at least one type selected from an aromatic ring substitution group that includes a hydrocarbon group of 8 or less carbon atoms, a hydrogen atom, a hydrocarbon group that includes 8 or less carbon atoms, and a phenyl group. Furthermore, n and m are 0 or positive integers, and are values that satisfy the expression n+m=3). In FIGS. 3A and 3B, $A_1$ to $A_6$ are at least one type chosen from —$(CH_2)_s$COOH (where s is an integer in the range of 0 to 3) and —$(CH_2)_u$NVW (where u is an integer in the range of 0 to 2, and V and W are each independently at least one type chosen from an aromatic ring substituent that includes at least one hydrocarbon group of 8 or less carbon atoms, a hydrogen atom, a hydrocarbon group that includes 8 or less carbon atoms, and a phenyl group). It should be noted that in the case of such an organic molecule, if the base material is a metal, then, for example, a metallic bond may be formed between the base material and the S atom, and a coordinate bond may be formed with the metal of the base material. Furthermore, a siloxane bond also may be formed with active hydrogen on the surface of the base material. Furthermore, in the organic molecule of the present example, an example was given in which the bonding group was a silane group. However, in addition to Si, it also will be similar with elements such as Ti, Ge, Sn, Zr and Hf and the like. Of course, other bonds are also possible between the base material and the organic molecule of the foregoing description.

The base material of the electrolyte membrane of the present invention is described next.

There is no particular limitation to the shape, material and structure, for example, of the base material of the electrolyte membrane of the present invention, provided that chemical bonds can be formed between the surface of the base material and the organic molecule described above. However, if the electrolyte membrane is to be used in a fuel cell, then it is necessary that the membrane is a material that does not dissolve in the fuel or water, or in weak acids such as formic acid and acetic acid that are by-products of electricity generation, and that it is an electrical insulator. It should be noted that "electrical insulator" means that the base material may be entirely electrically insulating, and if the base material is a metal, then it is sufficient that the surface of the base material is insulated by, a metal oxide or a resin, for example.

For example, the base material may include a material of at least one type selected from metal, metal oxide, glass, ceramic, clay, carbon, resin and silica. As a more specific example, it may include material of at least one type selected from among a transition metal oxide, alumina, fluorine-based resin, aramid resin, silicone resin, amide resin, imide resin and melamin resin. These materials may be selected freely depending on the characteristics necessary for it to be an electrolyte membrane, or such factors as the shape of the electrolyte membrane and type of organic molecule. If a base material made of a porous substance is necessary, then, for example, porous ceramics such as silica gel, zeolite, titania and alumina, and polyimide, polyurethane, polyphenol, polyethylene, polystyrene and polytetrafluoroethylene may be used. There are also other base materials that depend on the shape of the base material, that are described later.

Furthermore, the surface of the base material may be surface treated. Surface treatment may be either chemical treatment or physical treatment. More specifically, it is sufficient that the process stimulates the activation of the surface, such as an oxidation reaction, reduction reaction, formation of a specific group and change in wettability (change in the surface energy). In addition, it is also possible to deactivate the surface of the base material where necessary, for example by fluorination.

Figure 4:
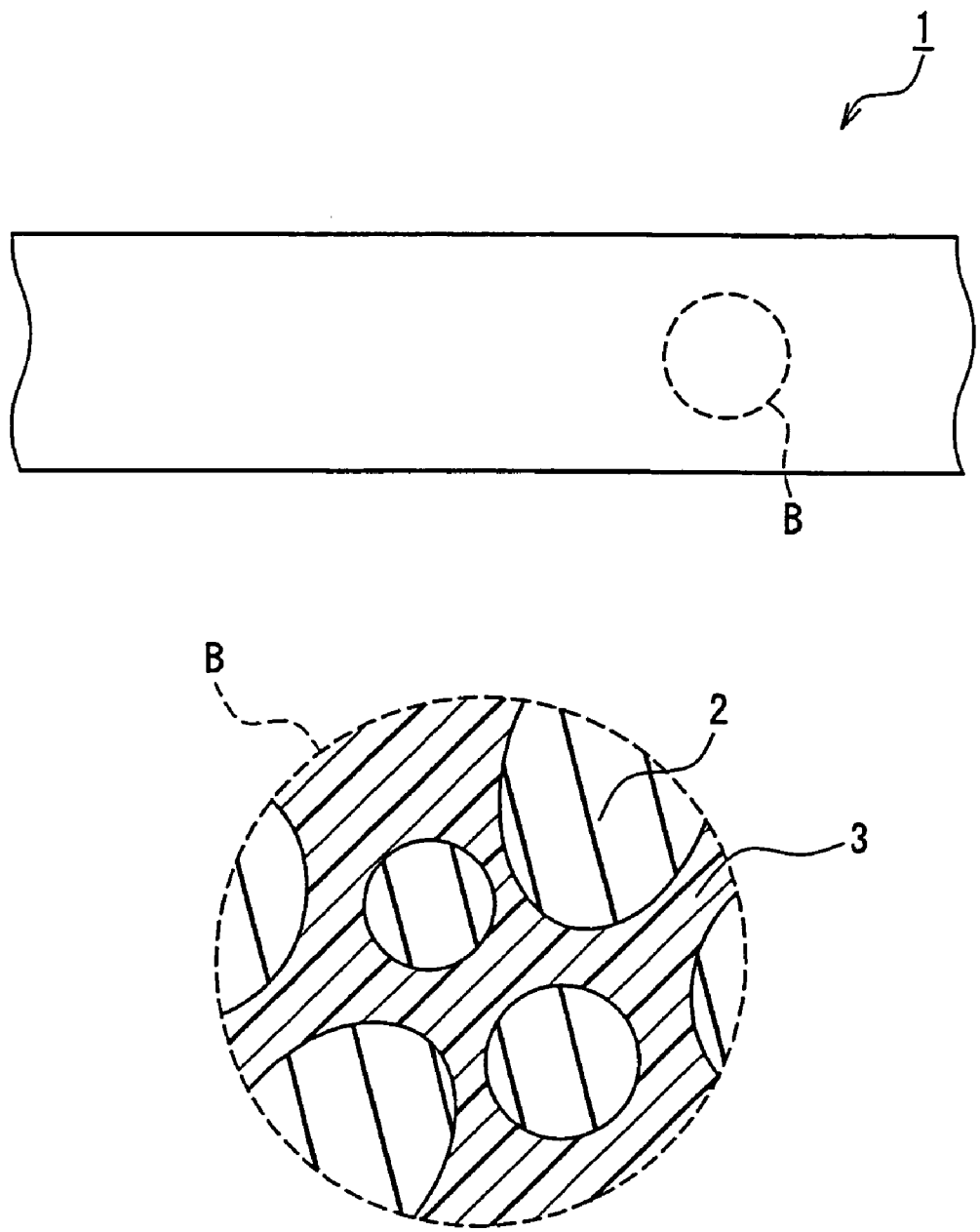
FIG. 4 is a schematic view showing another example of the electrolyte membrane of the present invention.

FIG. 4 shows an example of the electrolyte membrane of the present invention. In the electrolyte membrane 1 shown in FIG. 4, the base material 2 is a particulate, and the electrolyte membrane 1 includes amalgamation of such a base material 2.

For such an electrolyte membrane, the organic layer 3 may be formed on the surface of the base material 2, for example, after which the shape of the membrane may be formed by pressure molding or the like. Furthermore, for example, the base material 2 may be molded to the membrane shape by a process such as pressure molding, after which the organic layer 3 may be formed on the surface of the base material. With regard to formation of the electrolyte membrane 1, inorganic, or organic binders (binding agents) may be blended, or the organic layers 3 that are formed on the surface of the base material 2 may be bonded together, for example. It should be noted that in addition to the particle shapes shown in FIG. 4, the base material 2 may be fibrous, and a mixture of fibrous base material and particulate base material also may be used. It should be noted that in FIG. 4, a part of a region B of the electrolyte membrane 1 is enlarged and shown separately. (A region C in FIG. 5 is shown in a similar manner).

Furthermore, in the electrolyte membrane 1 shown in FIG. 4, the base material 2 itself may also be porous. It is also possible to form the organic molecule membrane in the inner portion of the base material 2.

Figure 5:
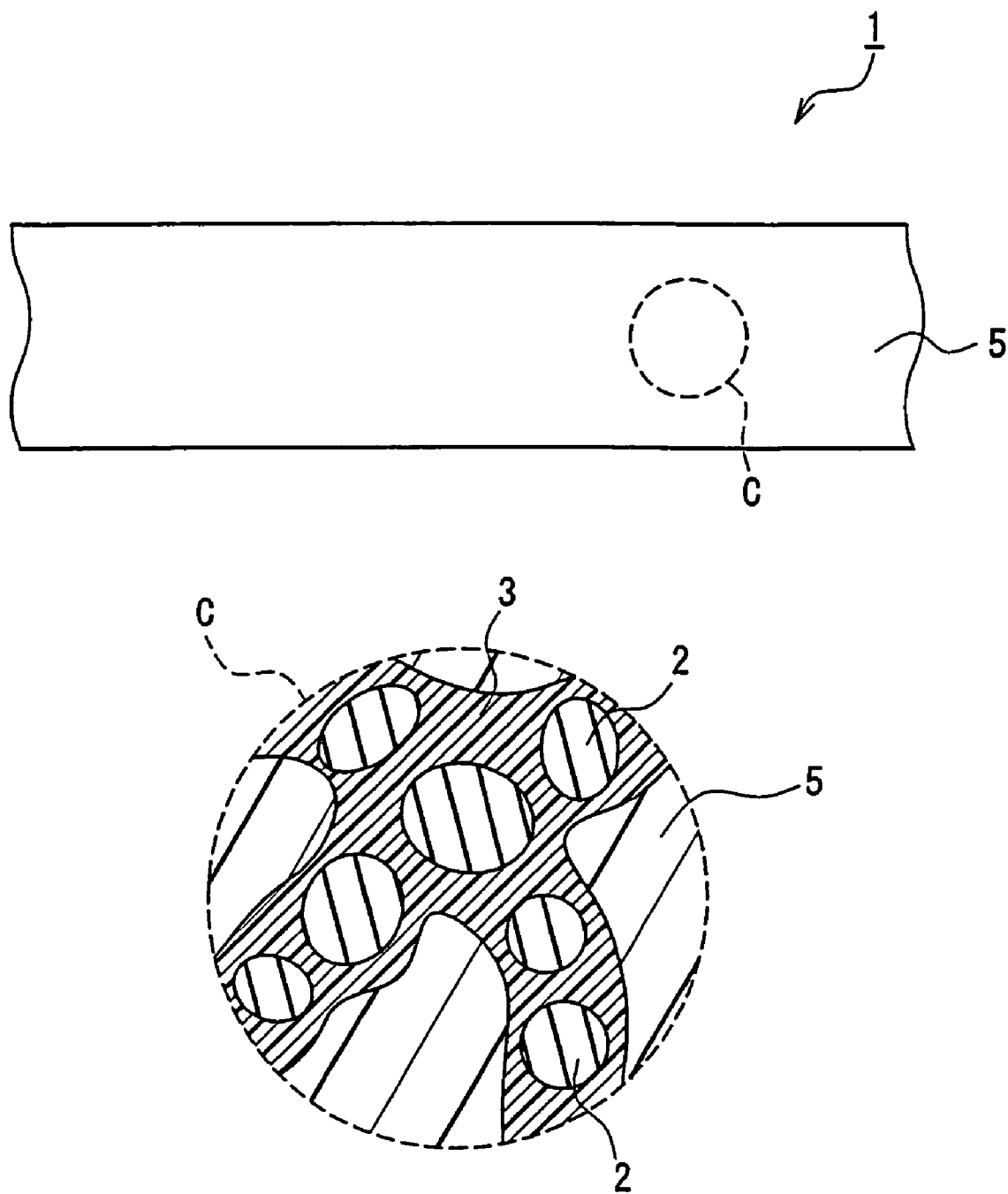
FIG. 5 is a schematic view showing yet another example of the electrolyte membrane of the present invention.

FIG. 5 shows another example of the electrolyte membrane of the present invention. The electrolyte membrane 1 shown in FIG. 5 further includes a porous membrane 5, and the base material 2 has at least one form, selected from particulates and fibres. Furthermore, the electrolyte membrane 1 includes a structure in which the base material 2 is disposed within pores of the porous membrane 5.

If the base material is a particulate, the average particle diameter thereof is not particularly limited, and can be in the range of 0.02 μm to 20 μm for example. Furthermore, the shape, for example, of the particles also is not particularly limited. If the base material is fibrous, then the size of those fibers is not particularly limited.

Furthermore, in the electrolyte membrane of the present invention, the base material also may have a folded film shape. By providing such an electrolyte membrane, it is possible to obtain an electrolyte membrane without using the porous membrane as described above. Furthermore, as will be described later, it is also not necessary that the base material itself is porous. Moreover, since it is not necessary to use a perfluoro monomer as in a PFSA membrane, the manufacturing process can be simplified and an electrolyte membrane can be provided at a lower cost. Moreover, because the thickness of the membrane may be set freely, it is also possible to provide an electrolyte membrane that has superior strength. Furthermore, because it is possible to achieve an interval between base materials in the order of 5 nm to 50 nm, an electrolyte membrane by which fuel cross-over is suppressed can be provided. It should be noted that the thickness of the electrolyte membrane can be provided in the order of 0.2 mm, for example.

Figure 6A:
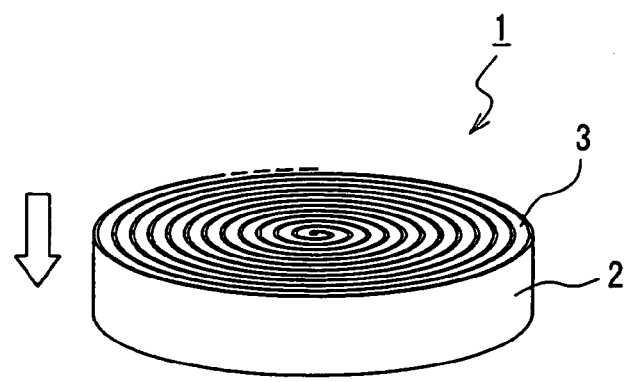
FIG. 6A to FIG. 6C are schematic views showing still further another example of the electrolyte membrane of the present invention.
Figure 6B:
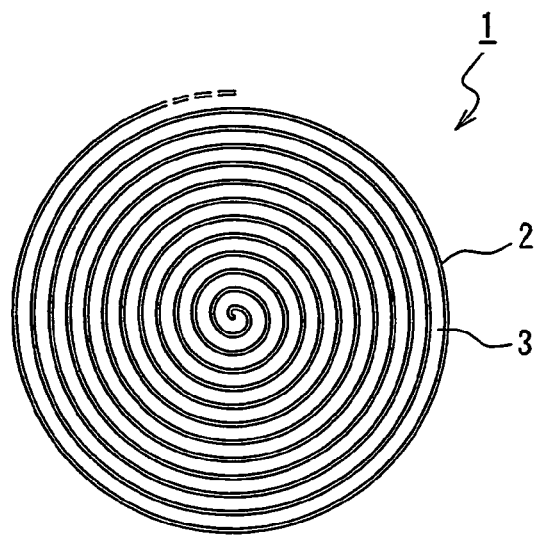
Figure 6C:
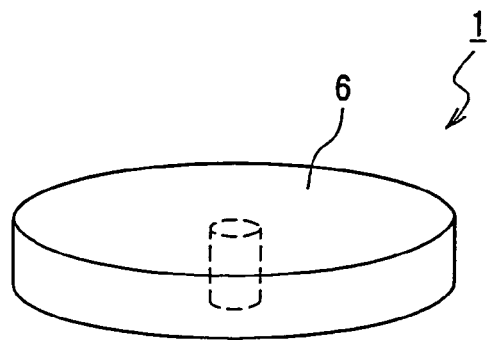

FIG. 6A to FIG. 6C show an example of such an electrolyte membrane. The electrolyte membrane 1 shown in FIG. 6A and FIG. 6B is an electrolyte membrane 1 having ionic conductivity, and it includes a base material 2 that has a wound up film shape, and organic molecules that contain an ion exchange group. Furthermore, the organic molecules are chemically bonded to the surface of the base material 2 to form an organic layer 3. The electrolyte membrane can conduct ions via the ion exchange groups in the organic layer 3, in a direction parallel to the surface of the base material 2 (for example in the direction of the arrow shown in FIG. 6A).

It should be noted that FIG. 6B is a schematic view of the electrolyte membrane 1 shown in FIG. 6A, as seen from above.

Furthermore, in order to illustrate the shape into which the base material 2 is wound, FIG. 6A and FIG. 6B are schematic views in which a portion of the electrolyte membrane has been enlarged. The electrolyte membrane 1 has a shape such as shown in FIG. 6C, for example, and FIG. 6A and FIG. 6B correspond to an enlargement of a part (dotted line portion) of the electrolyte membrane 1 shown in FIG. 6C. The spiral-shaped portion (long-side portion of the belt-shaped base material 2) shown in FIG. 6A and FIG. 6B corresponds to one part of a membrane surface 6 of the electrolyte membrane 1 shown in FIG. 6C. In a similar manner, FIG. 7A and FIG. 7B, which are described next, are enlarged schematic views of a part of the electrolyte membrane of the present invention, and the long-side portion of the belt-shaped base material 2 corresponds to one part of a membrane surface of the electrolyte membrane 1.

Figure 7A:
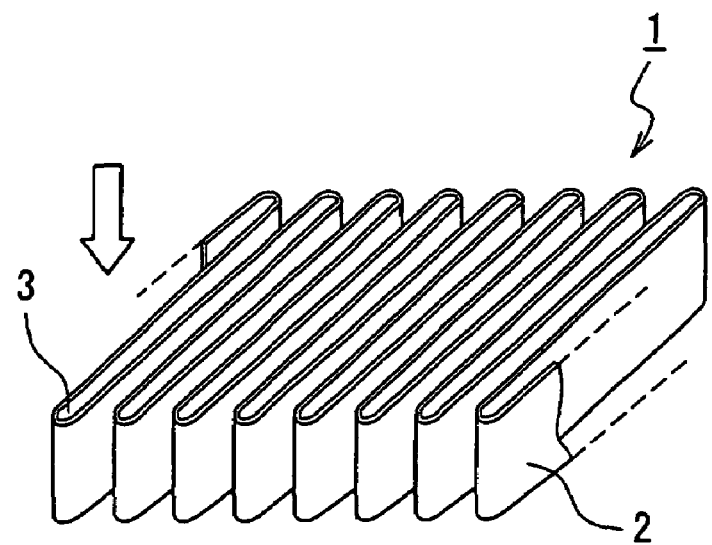
FIG. 7A and FIG. 7B are schematic views showing an example of the electrolyte membrane of the present invention, other than that given above.
Figure 7B:
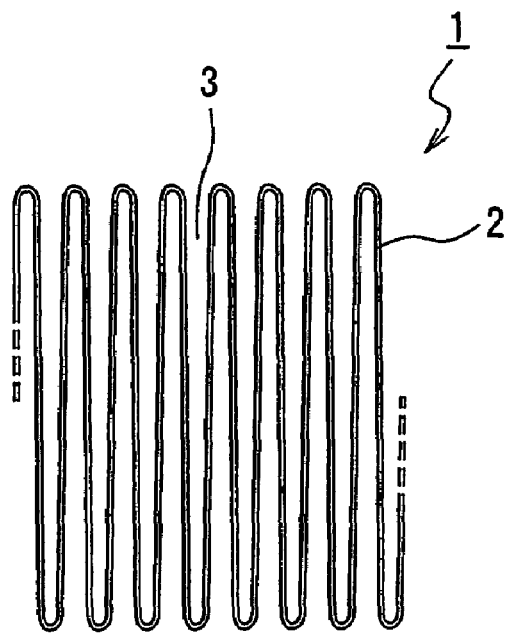

FIG. 7A and FIG. 7B show another example of the electrolyte membrane in which the base material has a folded film shape. In the electrolyte membrane 1 shown in FIG. 7A and FIG. 7B, the base material 2 is folded in an accordion-shape. In a similar manner to the example shown in FIG. 6A to FIG. 6C, the organic layer 3 is formed on the base material 2, and ions can be conducted via the ion exchange groups in the organic layer 3, in the direction parallel to the surface of the base material 2 (for example, in the direction of the arrow shown in FIG. 7A). It should be noted that FIG. 7B is a schematic view of the electrolyte membrane 1 shown in FIG. 7A as seen from above.

In the electrolyte membrane of the present invention, the direction in which the ions are conducted is the direction parallel to the surface of the organic molecule membrane. Thus, by providing an electrolyte membrane 1 as shown in FIG. 6A to FIG. 6C and in FIG. 7A to FIG. 7C, it is possible that the direction in which the ions are conducted can be set to a direction that is perpendicular to the membrane surface of the electrolyte membrane (direction of the arrow in FIG. 6A and FIG. 7A). Thus, the degree of ionic conductivity of the electrolyte can be maximized.

Put another way, in the electrolyte membrane of the present invention, the relationship between the surface of the base material and the surface of the electrolyte membrane may be perpendicular. In a similar manner, the direction in which ions are conducted can be set to a direction that is perpendicular with respect to the surface of the electrolyte membrane, and thus the degree of ionic conductivity of the electrolyte membrane can be maximized.

Provided that the material can be fashioned into a film shape, there is no particular limitation on the material used as the film-shaped base material. For example, high molecular weight material such as resin, or inorganic material such as metal oxide can be used. Of these, from the view point of strength, for example, it is preferable to use a material that is a composite of at least one inorganic material selected from glass, silica, alumina and titania, and a macromolecular material. For example, the material may be a base material that has a multilayer structure, which has a film made of a macromolecular material as its base, onto whose surface an inorganic material layer is formed. If an inorganic material layer is formed on the surface in this manner, then the organic molecule membrane can be formed on the surface of the base material more easily.

There is no particular limitation on the thickness of the base material that is film-shaped, and it can be in a range of 0.1 μm to 100 μm, for example, and is preferably in the range of 0.1 μm to 1 μm. Furthermore, the base material may be a porous membrane, and it may also be a non-poroues membrane. If it is a non-porous membrane, then it is possible to suppress the conductance of ions in the thickness direction of the base material. Thus, if an electrolyte membrane 1 is provided as shown in, for example, FIG. 6A to FIG. 6C, and in FIG. 7A to FIG. 7B, then the ions can be made to be conducted only in the direction that is perpendicular with respect to the surface of the electrolyte membrane, and it is possible to provide an electrolyte membrane that has a superior ionic conductivity.

There is also no particular limitation to the way of folding the base material that is film shaped (the folding pattern). For example, the base material may be wound as shown in FIG. 6A to FIG. 6C, or the base material may be folded in an accordion shape as shown in FIG. 7A and FIG. 7B. It is sufficient that it be selected as appropriate with regard to the characteristics it requires as an electrolyte membrane. When winding the base material, for example, a winding core made of metal or glass is prepared, and the base material may be wound around it. The cross-sectional shape of the winding core that is used is not particularly limited, and may be, for example, circular, oval or triangular, or the like. Furthermore, after winding the base material, the winding core may or may not be removed. If the winding core is removed, an electrolyte having ionic conductivity may be provided in the space where the winding core was present. The electrolyte that is provided at this time may use a material that differs from that of the organic molecule membrane. Furthermore, the base material may also be wound from the start without using a winding core (for example, the base material 2 in the example shown in FIG. 6A to FIG. 6C is wound without using a winding core). When the base material is folded, the entire repeating length of the fold of the base material may be uniform, but it also may be non-uniform.

There is no particular limitation on the interval between the film-shaped folded base materials. It may be, for example, in the range of 5 nm to 50 μm, and is preferably in the range of 5 nm to 10 nm. In such a way, the interval between base materials can be set to an order of a few nanometers, and thus it is also possible to provide an electrolyte membrane in which cross-over of fuel, for example, is suppressed.

The organic layer may be formed only on a single, principal surface of the film-shaped base material, but it may also be formed on both principal surfaces, namely the front and the back. If the organic layer is formed on both surfaces of the base material, it is possible to increase the degree of ionic conductivity of the electrolyte membrane.

As described above, with an electrolyte membrane whose base material is a folded film, the membrane thickness can be increased, and, furthermore, various materials, such as material that is a composition of inorganic material and macromolecular material can be used as the base material. Moreover, the base material can be a non-porous material. Thus, it is possible to provide an electrolyte membrane that has superior strength. For example, if it is integrated into a fuel cell, then an electrolyte membrane that has superior strength to better withstand the fluctuations in clamping pressure within the cell can be provided.

Furthermore in the electrolyte membrane of the present invention, the base material may be a porous membrane. For the porous membrane, it is preferable that a plurality of through holes that pierce the porous membrane are formed in a direction perpendicular to the porous membrane, and that the organic molecules are chemically bonded to the inner face of the through holes to form the organic molecule membrane. Moreover, it is particularly preferable that the cross-sectional area of through holes cut in a direction parallel to the surface of the porous membrane changes in the thickness direction of the porous membrane.

Figure 8:
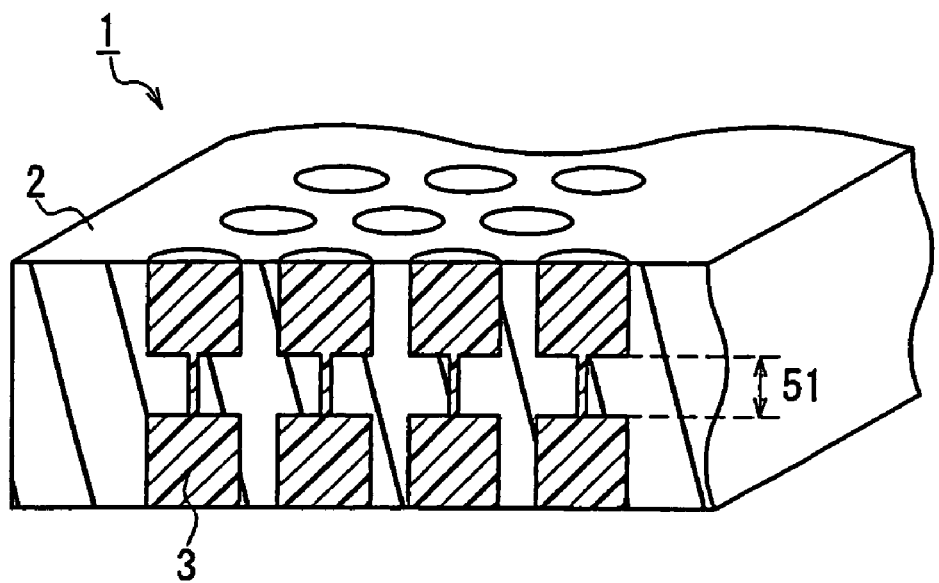
FIG. 8 is a schematic view showing an example of the electrolyte membrane of the present invention, other than that given above.

FIG. 8 shows an example of such an electrolyte membrane. The electrolyte membrane 1 shown in FIG. 8 includes the base material 2, which is a porous membrane, and an organic molecule having an ion exchange group. Here, a plurality of through holes pierce the porous membrane (base material 2) in the direction perpendicular to the membrane surface. Furthermore, the organic molecules chemically bond with the inner surface of the through holes to form the organic layer 3, and the cross-sectional area of the through holes cut in the direction parallel to the surface of the porous membrane changes in the thickness direction of the porous membrane. It should be noted that in this specification, "cross-sectional area of through holes", means the cross-sectional area of a face of a through hole that is taken in a direction parallel to the membrane surface of the porous membrane or the electrolyte membrane 1.

In such an electrolyte membrane 1, because the organic layer 3 is formed in a direction that is perpendicular to the membrane surface, the path of ionic conductance is formed in the direction that is perpendicular to the membrane surface, and so an electrolyte membrane that has superior ionic conductivity can be provided. Moreover, the cross-sectional area of the through holes changes in the thickness direction of the porous membrane, that is to say, because a region in which the cross-sectional area is relatively large, and a region in which the cross-sectional area is relatively small are provided in the through holes, it is possible to provide an electrolyte membrane 1 that has superior ionic conductivity and in which fuel cross-over is suppressed. In the region in which the cross-sectional area is relatively small, it is possible to reduce the size of the gap that exists in the inner portion of the through hole (for example, the inner diameter of the gap, or the cross-sectional area or the like), that is to say, cross-over of fuel can be suppressed. Furthermore, in the region in which the cross-sectional area is relatively large, it is possible to dispose ion exchange groups uniformly on the inner portion of the organic molecule membrane 3, that is to say, it is possible to increase the degree of ionic conductivity. It should be noted that such an electrolyte membrane may be obtained by, for example, laminating a plurality of porous membranes whose through hole cross-sectional areas are different. Furthermore, it is also possible to obtain such an electrolyte membrane by forming an electrolyte membrane in which, for example, a particulate base material is amalgamated. For example, it is possible to alter the density of the particulate base material in the thickness direction of the electrolyte membrane.

The following is a description of the gaps present in the inner portion of the through hole. If an electrolyte membrane is provided in which an organic and/or inorganic material is filled into the through holes of a porous membrane containing through holes, then it is possible that micro-gaps may still remain in the internal portion of the through holes. It is conceivable that the fuel moves via such gaps that run in the direction perpendicular to the membrane surface of the electrolyte membrane. Thus, in order to provide an electrolyte membrane that can suppress cross-over of fuel, it is necessary to reduce the size of the micro-gaps that exist in the through holes (in this application, such micro-gaps are called "capillaries") as far as possible.

The cross-sectional area of the through holes may change steadily, or it may change in a step-wise manner. If it changes in a step-wise manner, then by changing the ratio of through holes occupied by the region whose cross-sectional area is relatively large, compared to the region whose cross-sectional area is relatively small, it is easier to control the characteristics of the electrolyte membrane. For example, by increasing the ratio of the region whose cross-sectional area is relatively large, it is possible to provide an electrolyte membrane that has a superior degree of ionic conductivity.

Figure 9:
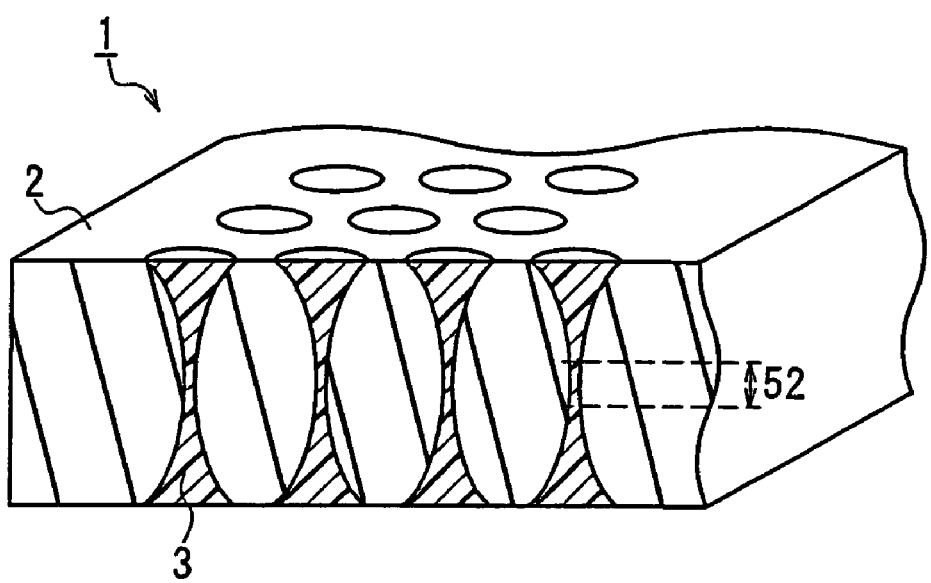
FIG. 9 is a schematic view showing an example of the electrolyte membrane of the present invention, other than that given above.
Figure 10:
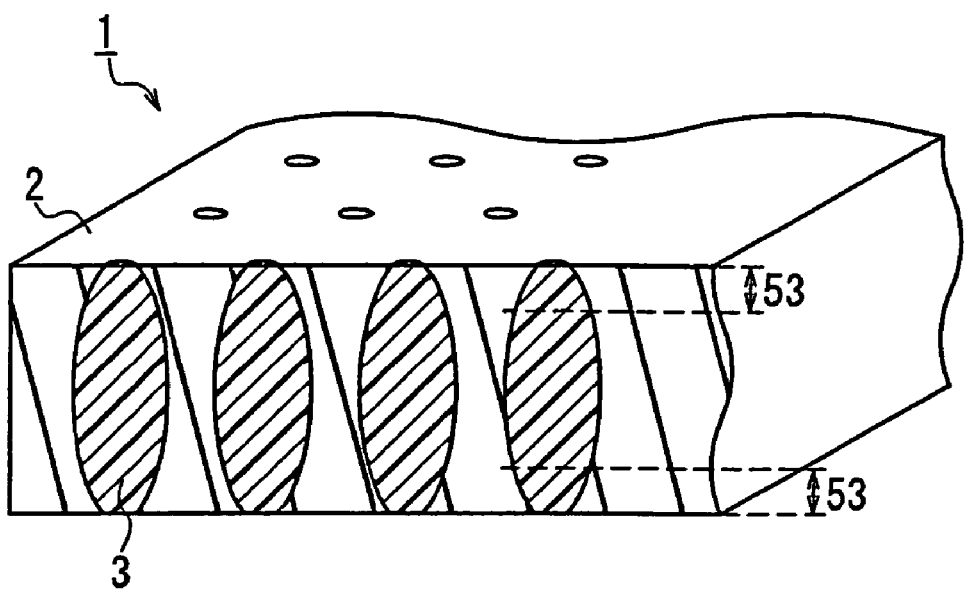
FIG. 10 is a schematic view showing an example of the electrolyte membrane of the present invention, other than that given above.
Figure 11:
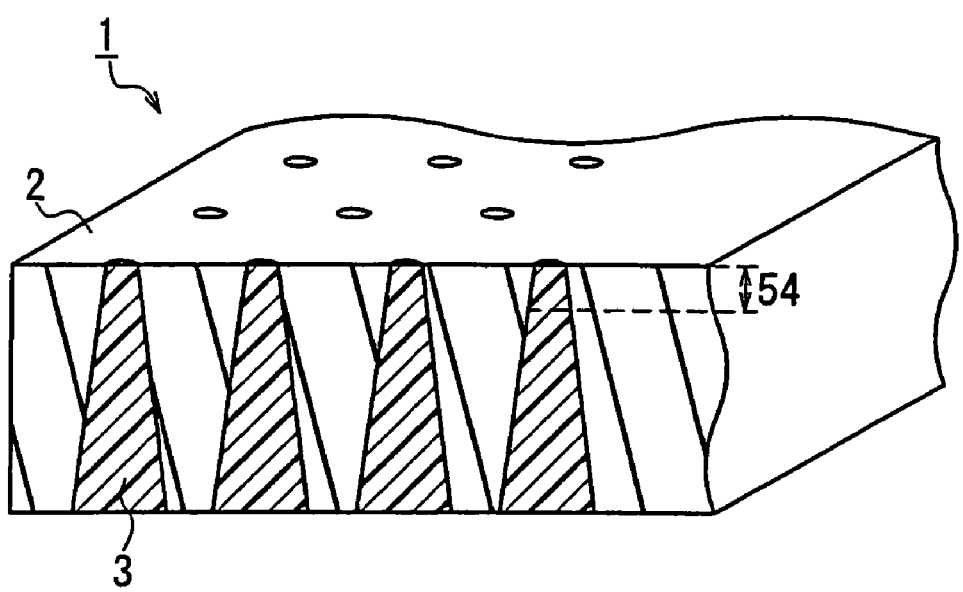
FIG. 11 is a schematic view showing an example of the electrolyte membrane of the present invention, other than that given above.

Other examples of such an electrolyte membrane is shown in FIG. 9 to FIG. 11. As shown in FIG. 8 to FIG. 11, the cross-sectional area of the through holes may be at a minimum in the vicinity of the center point in the thickness direction of the porous membrane for example, the electrolyte membrane 1 shown in FIG. 8 and FIG. 9.) Furthermore, the cross-sectional area of the through holes may become steadily smaller from the surface of the porous membrane in the thickness direction of the porous membrane toward the vicinity of its center (for example, the electrolyte membrane 1 shown in FIG. 9). Furthermore, the cross-sectional area of the through holes may be a minimum at the surface of the porous membrane (for example, the electrolyte membrane 1 shown in FIG. 10 and FIG. 11). Furthermore, the cross-sectional area of the through holes may become steadily larger from the surface of the porous membrane toward the vicinity of the center of the porous membrane in the thickness direction (for example, the electrolyte membrane 1 shown in FIG. 10). Furthermore, the cross-sectional area of the through holes may increase steadily from one surface of the porous membrane to the other surface of the porous membrane (for example, the electrolyte membrane 1 shown in FIG. 11).

The minimum value of the cross-sectional area of the through holes may be in the range of 3 $nm^2$ to 300 $nm^2$, and is preferably in the range of 3 $nm^2$ to 10 $nm^2$. In such an electrolyte membrane, it is possible to decrease the size of the capillaries in the inner portion of the through hole. That is to say it is possible to provide an electrolyte membrane in which fuel cross-over is suppressed further.

The ratio of the minimum value of the cross-sectional area of the through hole $S_{min}$ to the maximum value of the cross-sectional area of the through hole $S_{max}$ (that is to say, $S_{max}/S_{min}$) may be at least 1.2, and is preferably at least 3. In such an electrolyte membrane, it is possible to more uniformly dispose ion exchange groups in the inner portion of the organic layer.

In the region in which the cross-sectional area of the through hole is at a minimum, the minimum value of the cross-sectional area of the capillaries that exist in the inner portion of the through hole may be at most 10 $nm^2$, and is preferably 5 $nm^2$ at most. Because cross-over of fuel is thought to occur via the capillaries in the inner portion of the through holes, it is possible to provide an electrolyte membrane in which cross-over of fuel is further suppressed. In the case in which the fuel that is used is methanol, the projected area of methanol is approximately 0.14 $nm^2$ as calculated from the molecular diameter, and is one of the smaller of the organic fuels used in fuel cells. The above noted minimum value is much larger than 0.14 $nm^2$. However, in practice, since the inner portion of the capillaries is covered by a multitude of ion exchange groups, it seems that a solid layer is formed due to dissociated hydrogen ions and the resulting hydration water, and thus it would appear possible to suppress the cross-over of fuel such as methanol further.

It should be noted that the region in which the cross-sectional area of the through holes is at a minimum is shown, for example, as a region 51 in the electrolyte membrane 1 of FIG. 8. Furthermore, for example in the electrolyte membrane 1 shown in FIG. 9, this is shown as a region 52 in the vicinity of the center of the porous membrane in the thickness direction, and as a region 53 and a region 54 in the vicinity of the surface of the porous membrane in the electrolyte membrane 1 shown in FIG. 10 and FIG. 11. As shown in FIG. 9 to FIG. 11, in electrolyte membranes in which the cross-sectional area of the through holes change steadily, the length of these regions with respect to the direction that is perpendicular to the surface of the porous membrane can be in the range of 10% to 50%, for example, of the thickness of the porous membrane.

The material used as the porous membrane may employ a material of at least one type selected from, for example, glass, silica, alumina and titania. It should be noted that if an organic material is used as the porous membrane, then the inner surface of the through holes may also be coated with an inorganic material such as described above.

The proportion of through holes in the porous membrane can be in the range of 10 vol % to 60 vol %, for example, when expressed as porosity. It should be noted that holes other than through holes may exist within the porous membrane. Furthermore, the thickness of the porous membrane may, for example, be any thickness required of it as an electrolyte membrane, for example, a range of 5 μm to 1 mm. The area of the porous membrane may be, for example, the area necessary to form a fuel cell.

Figure 12:
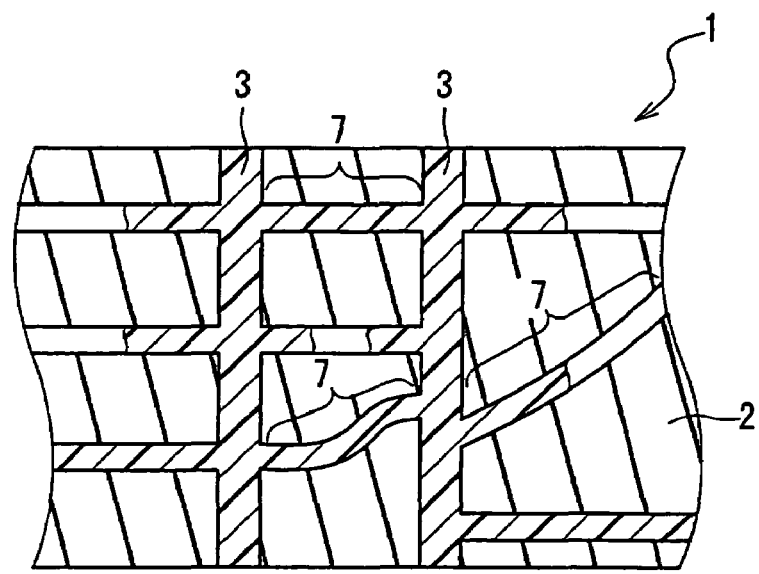
FIG. 12 is a schematic view showing an example of the electrolyte membrane of the present invention, other than that given above.

FIG. 12 shows another example of the electrolyte membrane of the present invention.

The electrolyte membrane 1 shown in FIG. 12 is an electrolyte membrane 1 having ionic conductance, and it includes a base material 2, which is a porous membrane, and organic molecules that have ion exchange groups. A plurality of through holes that pierce the porous membrane in the direction perpendicular to the surface of the porous membrane, and fine holes 7 that connect the through holes, are formed in the porous membrane. Both ends of the fine holes 7 are open. Furthermore, the organic molecules are chemically bonded to the inner surface of the through holes to form the organic layer 3.

In such an electrolyte membrane 1, it is possible to transport ions from one membrane surface to the other membrane surface via an organic layer 3 that includes organic molecules having ion exchange groups. That is to say, it is possible to provide an electrolyte membrane 1 having ionic conductivity. Furthermore, since the organic layer 3 is formed in the direction perpendicular to the porous membrane surface, a path of ionic conductance is formed in the direction perpendicular to the surface, and it is possible to provide an electrolyte membrane with superior ionic conductivity. Moreover, because the fine holes 7, which are connected to the through holes, and which are open ended are formed, it is possible to provide a more uniform organic layer 3 in the inner portion of the through holes, and thus to provide the electrolyte membrane 1 with superior characteristics (for example, a membrane that has superior ionic conductivity and which can further suppress cross-over of fuel).

The reason why the organic layer 3 of the inner portion of the through holes is more uniform is described next. In order to form a uniform organic layer 3 from organic molecules having ion exchange groups, on the inner portion of the through holes, it is necessary to impregnate the organic molecules uniformly into the interior portion of the through holes. However, in the state in which only through holes are formed, there is also the possibility, however small, that air for example, will remain in the interior portion of the through holes. On the other hand, if fine holes 7, which are connected to the through holes and which are open ended, are disposed as in the electrolyte membrane shown in FIG. 12, the possibility decreases that air, for example, will remain in the internal portion of the through holes due to the fine holes 7. Also when by-products are produced when the organic molecules chemically bond with the inner surface of the through holes, then it is possible to assign to the fine holes 7 the role of a buffer against the by-products. Thus, it is possible to provide the organic layer 3 more uniformly on the inner portion of the through holes.

The shape of the fine holes 7 is not particularly limited. Furthermore, their area (the cross-sectional area of a face taken in a direction perpendicular to the direction in which the fine hole 7 extends) may be in the range of 3 nm$^2$ to 2,000 nm$^2$, and is preferably in the range of 3 nm$^2$ to 20 nm$^2$. It is preferable that the cross-sectional area of the fine holes 7 is smaller than the cross-sectional area of the through holes. Furthermore, there is no particular limitation to the direction in which the fine holes 7 extend. For example, it is not necessary that they are connected perpendicularly to the through holes, for example, and they may be connected at any angle. Furthermore, both ends of the fine holes 7 may be connected to through holes, and the through holes to which they are connected may be the same hole, or they may be different holes.

Figure 13:
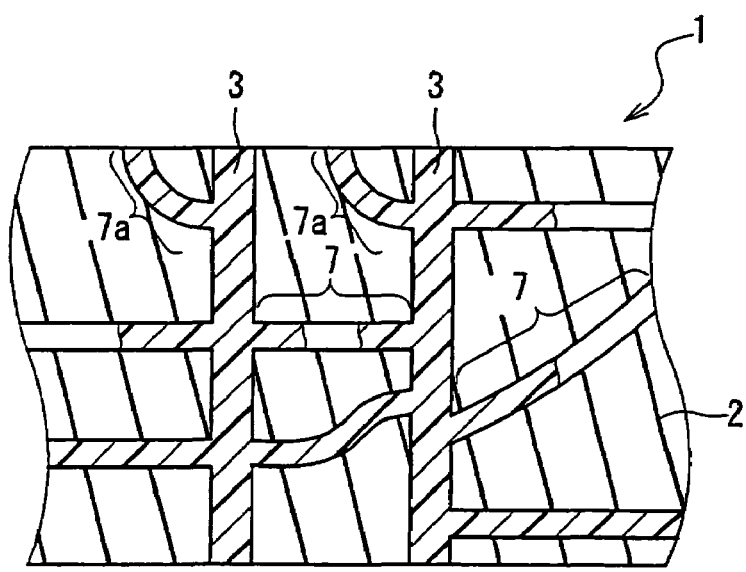
FIG. 13 is a schematic view showing an example of the electrolyte membrane of the present invention, other than that given above.

Furthermore, one end of the fine hole 7 may be connected to a through hole, while the other end of the fine hole 7 may be connected to the surface of the porous membrane (that is, the surface of the electrolyte membrane) (for example, fine holes 7a shown in FIG. 13). In this case, when impregnating the organic molecules into the inner portion of the through holes to form the organic layer 3, it is possible to effectively discharge air and by-products out of the electrolyte membrane 1. Furthermore, if after functional groups having ionic conductivity are inserted, an aggregate of the organic molecules is formed in the internal portion of the through hole, then it is necessary to impregnate the internal portion of the through hole with a separate reaction reagent, but in such an electrolyte membrane it is possible to impregnate the reaction reagent with greater speed. Thus, it is possible to provide the electrolyte membrane 1 with superior characteristics.

More specifically, if a chlorosilane-based coupling agent is used as the organic molecule, hydrogen chloride is generated as a by-product. When hydrogen chloride remains within the porous membrane, there is a possibility that the coupling reaction of the organic molecule in the region in which it remains will be impeded. However, in the electrolyte membrane 1 shown in FIG. 12 and FIG. 13, this type of impediment can be suppressed because the hydrogen chloride that is generated can be discharged effectively.

In the electrolyte membrane 1 shown in FIG. 12 and FIG. 13, provided that the through holes and the fine holes 7 are formed, the shape of the porous membrane is not particularly limited. For example, the membrane may made be from a porous material, the membrane may be formed by an aggregation of flat plates (at this time, the flat plates, for example, may be porous, and the gaps formed between the flat plates may be the through holes or the fine holes), and the membrane may be formed by an aggregation of particles (for example, the gaps formed between the particles may be the through holes or the fine holes).

In the electrolyte membrane of the present invention, it is not necessary that it includes only a single base material, and a plurality of base materials is possible. For example, if the base material of the electrolyte membrane has a folded film shape, then it is possible to fold a laminated aggregate of a plurality of base materials, and it is also possible to configure the electrolyte membrane by aggregating a plurality of folded base materials. Furthermore, as in the foregoing description, by laminating a plurality of base materials of a porous membrane that has through holes and whose through holes have different cross-sectional areas, it is possible to provide an electrolyte membrane in which the cross-sectional area of the through holes changes in the thickness direction of the porous membrane.

In the electrolyte membrane of the present invention, the specific area of the base material per unit volume, as measured by vapor adsorption measurement, can be at least 100 m$^2$/cm$^3$, and is preferably at least 200 m$^2$/cm$^3$. The larger the surface of the base material, the more organic molecules can bond to the base material. Thus, it is possible to provide an electrolyte membrane that has superior ionic conductivity. It should be noted that there is no particular upper limit on the specific surface area, but an upper limit may be in the order of 1000 m$^2$/cm$^3$.

There is no particular limit to the method of measuring the specific area by vapor adsorption, and any method known in the art may be used. If nitrogen adsorption is used as the vapor adsorption method, then for the measurement conditions, analysis can be performed based on BET theory after measuring the nitrogen adsorption isotherm.

In the electrolyte membrane of the present invention, when the porosity of the base material is $\epsilon$ (volume %), and the average hole diameter of the through holes is d (nm), $\epsilon$ and d can satisfy the relationship $(4 \times \epsilon)/d > 10$. Within this, it is preferable to satisfy the relationship $(4 \times \epsilon)/d > 20$. The value expressed by the foregoing expressions is a value that corresponds to the specific surface area of the base material. Thus, if $\epsilon$ and d satisfy the foregoing expressions, an electrolyte membrane with superior ionic conductivity can be provided. It should be noted that there is no particular upper limit to the foregoing expressions, however it can be set to 300, for example.

Figure 14:
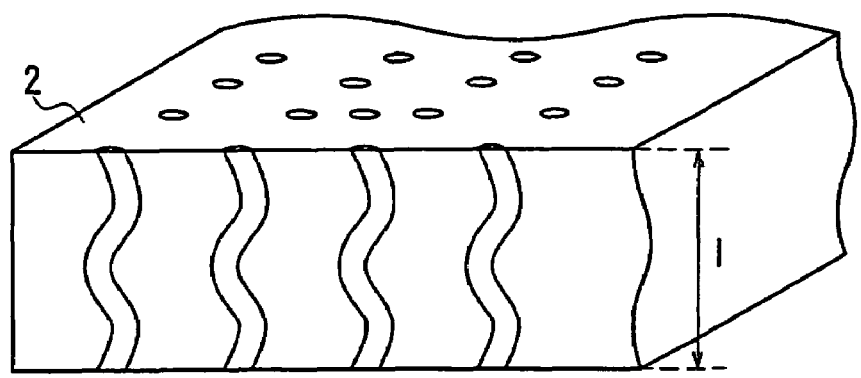
FIG. 14 is a schematic view showing an example of a model of a base material containing through holes.

If the porous membrane having through holes as described above is used as the base material, then the shape of the porous membrane may be visualized by using a model as shown in FIG. 14. In the model shown in FIG. 14, the average hole diameter of the through holes that have a given distribution in an actual porous membrane is represented by a single average value, and there is a plurality of through holes having a diameter of an average hole diameter. In this model, the shape of the though holes of the porous membrane can be described by the parameters as follows.

The area of the base material 2 (porous membrane) is S (cm$^2$), the thickness of the base material 2 is 1 (cm), the porosity of the base material is $\epsilon$ (volume %), the average hole diameter of the through holes is d (nm) and the average tortuosity of the through holes is $\tau$. It should be noted that the average tortuosity $\tau$ is defined as the value of the average length in the piercing direction of the through hole divided by the thickness of the base material.

The volume occupied by a single through hole is expressed in formula (1) below.

$$\pi \times (d/2)^2 \times \tau \times 1 \qquad (1)$$

Furthermore, the volume occupied by all through holes is expressed in formula (2) below.

$$S \times 1 \times \epsilon \qquad (2)$$

Consequently, the number n of through holes present in an area S of the base material, is expressed in formula (3) below.

$$n = \text{formula (2)/formula (1)} = (4 \times S \times \epsilon)/(\pi \times d^2 \times \tau) \qquad (3)$$

The total area of the base material may be thought of as being substantially the sum of the surface area of the through holes, and consequently the total surface area of the base material may be obtained by multiplying the surface area of a single through hole by the number of through holes.

The area of a single through hole is expressed in formula (4) below.

$$\pi \times d \times \tau \times 1 \quad (4)$$

Thus, the total surface area of the base material is expressed in formula (5) below.

$$\text{formula (3)} \times \text{formula (4)} = (4 \times S \times \epsilon \times 1)/d \quad (5)$$

That is to say, the specific surface area per unit volume of the base material is expressed by:

$$\text{formula (5)}/(S \times 1) = (4 \times \epsilon)/d.$$

In a similar manner, when the porosity of the base material is $\epsilon$ (volume %), and the average tortuosity of the through holes is $\tau$, in the electrolyte membrane of the present invention, $\epsilon$ and $\tau$ may satisfy the relationship $\epsilon/\tau^2 < 20$. Within this, it is preferable that they satisfy the relationship $\epsilon/\tau^2 < 10$. The value shown in the formula above is a value corresponding to the amount of cross-over of fuel. Thus, if $\epsilon$ and $\tau$ satisfy the foregoing expression, it is possible to provide an electrolyte membrane in which cross-over of fuel is better suppressed. It should be noted that although a lower limit of the foregoing expression is not particularly limited, it may be set to 0.001, for example.

In the electrolyte membrane, a substance is further arranged on the face of the membrane on the side opposite the face that is bonded to the base material so as to fill gaps present in the inner portion of the through holes. Thus, it is possible to provide an electrolyte membrane in which cross-over of fuel is further suppressed.

Figure 15:
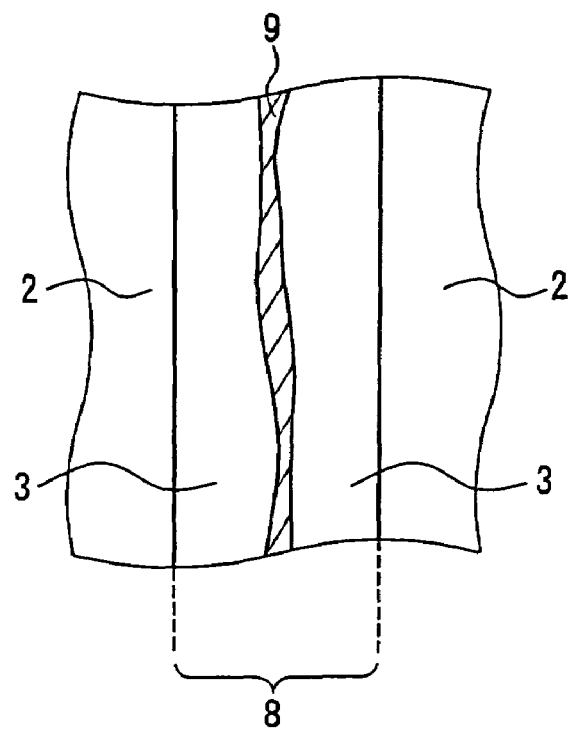
FIG. 15 is a schematic view for describing an example of the electrolyte membrane of the present invention other than that described above.

The following is a description of this with reference to FIG. 15. As described above, the base material 2 is a porous membrane containing through holes 8, and in the case of an electrolyte membrane in which the organic layer 3 is formed on the inner portion of the through holes 8, it is possible that micro-gaps remain in the inner portion of the through holes. If a substance 9 also is provided such that those gaps are filled, then the structure of the inner portion of the through hole 8 becomes finer, and it is possible to further suppress cross-over of fuel.

There is no particular limitation to the type of the substance 9. For example, it may be water-repellent matter. If the fuel is a hydrophilic fuel such as methanol or an aqueous solution of methanol, then it may be even more effective in suppressing cross-over of fuel. As water-repellent matter, a polymer of hydrocarbon molecules, for example, or matter in which one part of the hydrocarbon is substituted with fluorine, may be used.

Furthermore, the substance 9 may be matter that is a polymer of at least one type of material selected from organic and inorganic material. Such matter may be obtained by, for example, filling the capillaries that remain in the inner portion of the through hole with a precursor material of the substance and then polymerizing the precursor material. Generally, it is considered that the precursor material has a lower molecular weight (for example, the precursor material is not limited to solids, but may also be a liquid or a gas), and thus it is possible to fill the capillaries remaining in the inner portion of the though holes more effectively. Thus, it is possible to make the inner portion of the through holes even finer.

As the organic material, it is possible to make use of matter such as styrene, divinylbenzene, methyl methacrylate, or matter in which one part of these is substituted with fluorine. As the inorganic material, it is possible to use matter such as tetramethoxysilane, tetraethoxysilane, and 3-glycidoxypropyltrimethoxysilane, which is a silane compound containing organic groups. Furthermore, there is no particular limitation to the polymerization method, and any method known in the art may be used, such as the sol-gel method, radical polymerization, anionic polymerization, cationic polymerization, ribbing polymerization, catalytic polymerization, condensation polymerization, ring opening reactions and thermal polymerization. It should be noted that from the view point of stability and durability, it is preferable that one end of the molecule of the substance is bonded to the base material to fill the capillaries in the inner portion of the through holes. Thus, the one end may be bonded directly to the base material, or it may be bonded via the organic layer (in which the organic molecule in the organic layer is bonded with the one end).

Next, a method for manufacturing the electrolyte membrane of the present invention is described. Here, as an example, a method for manufacturing the electrolyte membrane shown in FIG. 8 is shown.

Figure 16A:
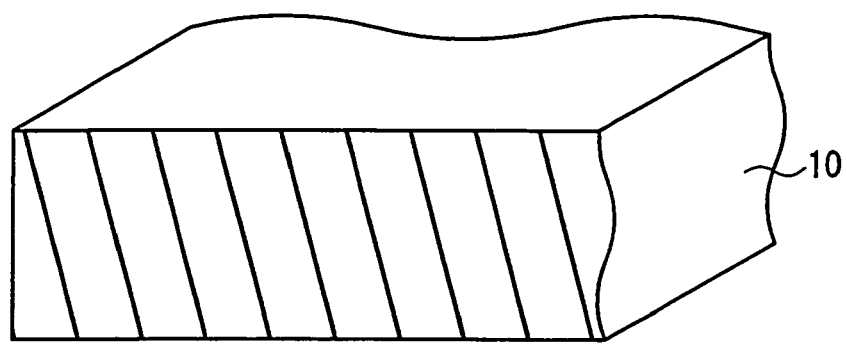
FIG. 16A to FIG. 16C are schematic process diagrams showing an example of a method for manufacturing the electrolyte membrane of the present invention.
Figure 16B:
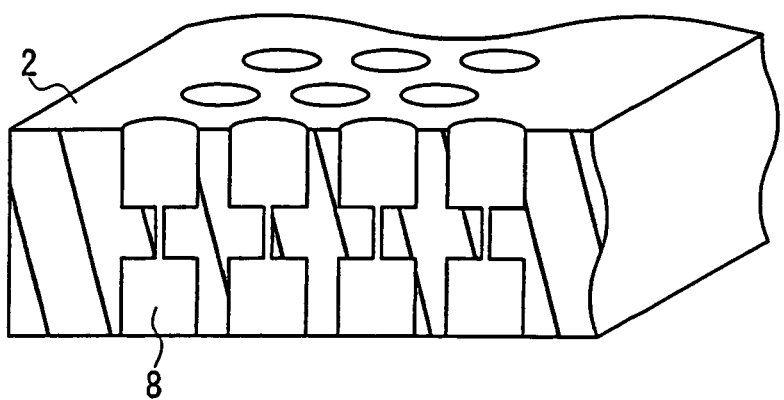
Figure 16C:
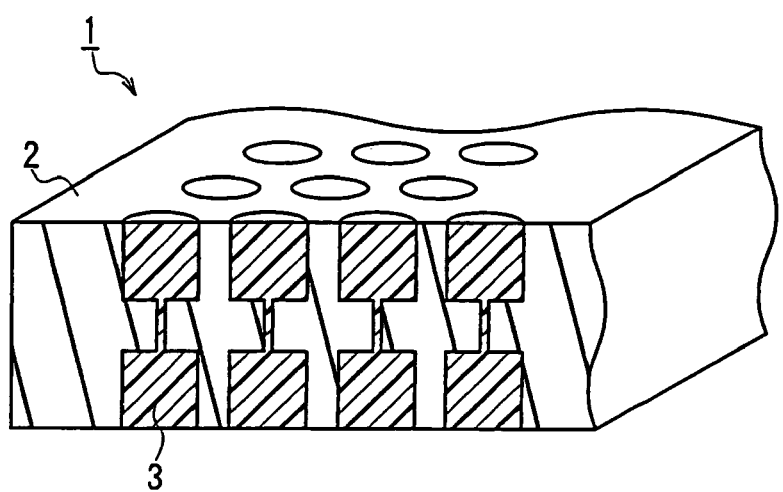

The manufacturing method shown in FIG. 16A to FIG. 16C is the method for manufacturing the electrolyte membrane shown in FIG. 8, and it includes:

(i) a step of forming a first membrane 10 (FIG. 16A);

(ii) a step of forming the base material 2, which is a porous membrane in which through holes 8 are formed in a direction that is perpendicular to the membrane surface, by forming the through holes 8 that pierce the first membrane 10 in a direction perpendicular to the membrane surface of the first membrane 10 (FIG. 16B), and (iii) a step of forming the electrolyte membrane 1 by chemically bonding organic molecules having ion exchange groups to the inner surface of the through holes 8, forming the organic layer 3 (FIG. 16C). In the electrolyte membrane 1 shown in FIG. 16, ions are conducted via the organic layer 3. Furthermore, the cross-sectional area of the through holes 8, taken in the direction of the membrane surface of the porous membrane, changes in the thickness direction of the porous membrane.

Provided that the first membrane that is formed in step (i) can form the porous membrane in which through holes are formed in the direction perpendicular to the membrane surface in step (ii), then there is no particular limitation on the first membrane. For example, it is sufficient to form the first membrane from the same material that was used for the porous membrane formed in step (ii) (that is to say, the porous membrane included in the electrolyte membrane).

In step (i), there is no particular limitation to the method for forming the first membrane, and any film forming method known in the art may be used. The film forming method may be chosen depending on the material that is used for the first membrane, and may employ sputtering methods such as PVD, CVD and the sol-gel method, for example.

Furthermore, in step (i), the first membrane may be formed on a substrate. For the substrate, for example, a metal or semiconductor substrate such as Si, Ni and Al, or a ceramic substrate such as silica and alumina may be used. Furthermore, the substrate also may be a substrate of a porous material. In this case, in step (iii), the organic molecules may be bonded more easily. It should be noted that if the first membrane is formed on a substrate, then the separation of the substrate and the first membrane (after step (ii), the separation of the substrate and the porous membrane) may be performed at any time. Furthermore, it is also possible to not separate them.

In step (ii), there is no particular limitation to the step of piercing the through holes through the membrane 1 in the direction perpendicular to the membrane surface of the first membrane.

For example, the first membrane formed in step (i) may be made of an amorphous compound that includes Fe and O at least one type of element selected from Si and Ti, wherein the composition ratio of the at least one type of element and Fe can change in the thickness direction of the first membrane. In such a manufacturing method, by changing the composition ratio, the cross-sectional area of the through holes and the porosity formed in step (ii) may be controlled. For example, by increasing the composition ratio of Fe, it is possible to increase the cross-sectional area of the through holes. Conversely, by decreasing the composition ratio of Fe, the cross-sectional area of the through holes may be decreased. It should be noted that in this method, it is possible to obtain a porous membrane made of at least one type of material selected from silica and titania.

There is no particular limitation on the method for forming a first membrane whose composition ratio changes in the thickness direction. For example, sputtering may be carried out using two type of targets (for example, one target being a target including the at least one type of element described above, and the other target being a target that includes Fe).

Furthermore, in the manufacturing method of the present invention, step (ii) also may include: (a) a step of phase separating an oxide of the at least one type of element and an oxide of the Fe that grew in the direction perpendicular to the membrane surface of the first membrane, by heating the first membrane, and (b) a step of forming a porous membrane in which through holes are formed in the direction perpendicular to the membrane surface, by removing the oxide of the Fe. In such a manufacturing method, it is possible to control the cross-sectional area and the porosity, and the like, according to the composition ratio set in step (i). More specifically, by increasing the composition of Fe, the cross-sectional area of the through holes can be increased.

There is no particular limitation on the heating temperature in step (a). For example, if Si is used as the at least one type of element, then the temperature is in the range 400° C. to 800° C. The heat treatment may be carried out in an atmosphere that includes oxygen, such as air, and the heating time may be in the range of 60 min to 600 min, for example. It should be noted that if Si and Fe are used, then $SiO_2$ and FeO are phase separated.

In step (b), there is no particular limitation on the method for removing the oxide of Fe. For example, it may be removed by dipping the entirety in an aqueous acidic solution. For the aqueous acidic solution, one such as a solution of hydrochloric acid diluted in water may be used, for example.

In step (iii), there is no particular limitation to the method for chemically bonding the organic molecules containing ion exchange groups to the inner surface of the through holes. For example, a silane coupling agent may be used. More specifically, it is possible, for example, to dip the porous membrane formed in step (ii) in a solution containing the silane coupling agent, after which it may be dipped in a solution containing the organic molecules. It should be noted that for the ion exchange groups, organic molecules and silane coupling agent, the ion exchange group, organic molecule and silane coupling agent described above may be used. If the organic molecule itself includes a silane group, it is only necessary to dip the porous membrane in the solution in which the organic molecules are included, and thus it is possible to obtain the electrolyte membrane with greater productivity.

Furthermore, in the method for changing the composition ratio of the at least one type of element and Fe in the thickness direction of the first membrane, the cross-sectional area of the through holes can be changed freely in the thickness direction of the porous membrane. For example, the composition ratio may change in a step-wise manner, and it may change steadily. If through holes are formed in which the cross-sectional area changes steadily, then in step (iii), it is possible to bond the organic molecules uniformly.

In step (ii), it is possible to set freely the part of the porous membrane in the thickness direction in which the part of the through holes whose cross sectional area is a minimum is to be disposed.

For example, the minimum cross-sectional area of the through holes may be in the vicinity of the center of the porous membrane in the thickness direction. If the porous membrane is dipped in a silane coupling agent, or a solution including the organic molecules, then it is felt that these solutions react from the vicinity of the membrane surface of the porous membrane. Thus, the larger the cross-sectional area of the through holes in the vicinity of the surface of the porous membrane, the larger is its reactivity.

Furthermore, the cross-sectional area of the through holes also may increase steadily from the membrane surface of the porous membrane toward the vicinity of the center of the porous membrane in the thickness direction. Generally, the surface portion of a porous membrane made of an inorganic material is its weakest part with respect to bending and pressure. Thus, in this case, it is possible to increase the strength of the porous membrane further.

Other than this, the cross-sectional area of the through holes also may increase steadily from one membrane surface of the porous membrane to the other membrane surface. In this case, the porous membrane may be dipped in the solution that includes the silane coupling agent or the organic molecules starting from the surface of the membrane with the larger cross-sectional area of the through holes.

The following is a description of a membrane electrode assembly (MEA) and a fuel cell of the present invention.

Figure 17:
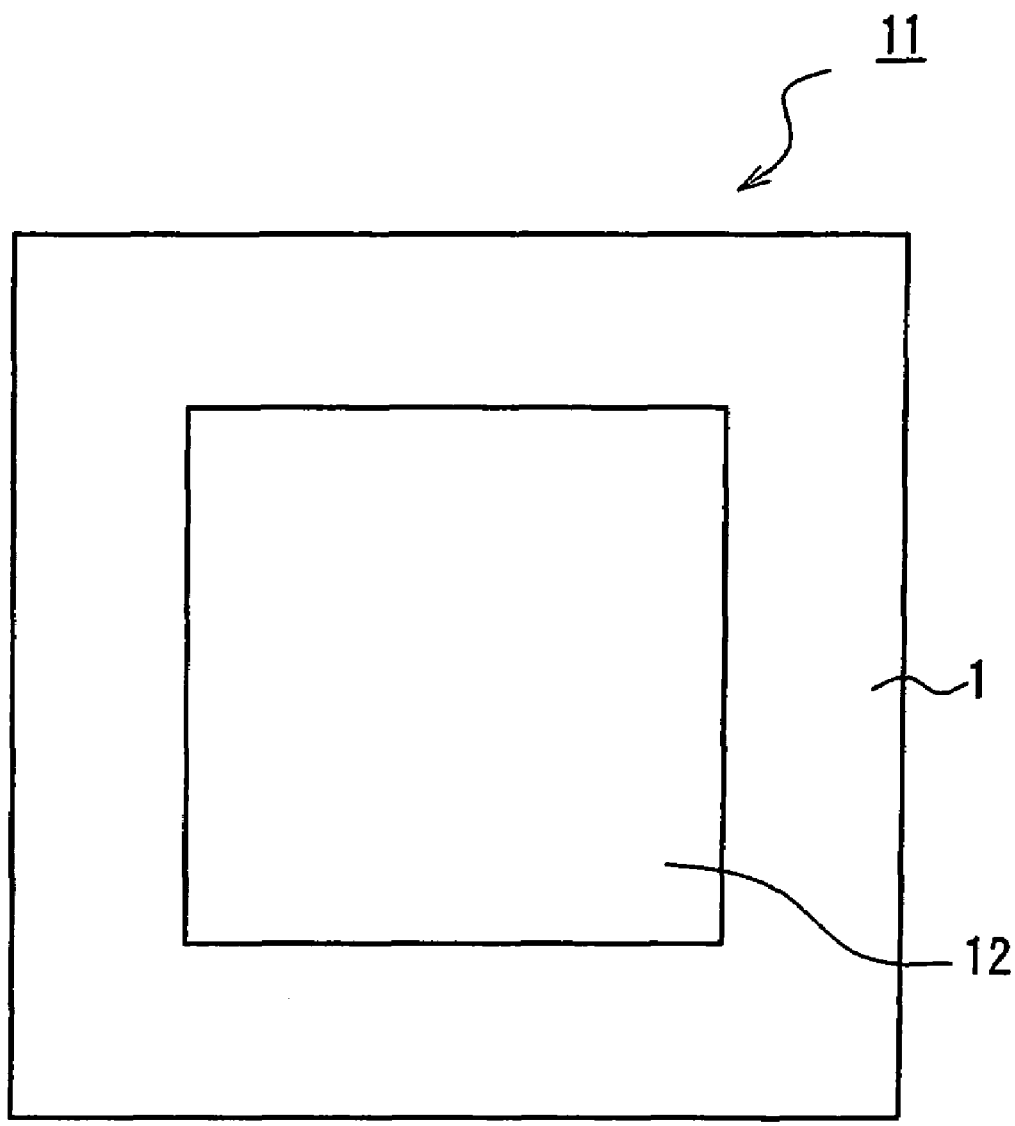
FIG. 17 is a schematic view showing an example of a membrane electrode assembly of the present invention.

An MEA 11 shown in FIG. 17 includes the electrolyte membrane 1 of the present invention, a cathode electrode 12 and an anode electrode, wherein the electrolyte membrane 1 includes a structure in which it is disposed between the cathode electrode 12 and the anode electrode. In such an MEA, since it uses the electrolyte membrane of the present invention that was described, it is possible to provide an MEA that has superior characteristics.

It should be noted that in FIG. 17, the anode electrode is disposed on the other side of the electrolyte membrane, and thus is not illustrated.

The anode electrode and cathode electrode are not particularly limited, and usual electrodes can be used. Furthermore, at least one electrode selected from the anode electrode and the cathode electrode, may include some of the electrolyte, being the electrolyte of the present invention further refined.

Figure 18:
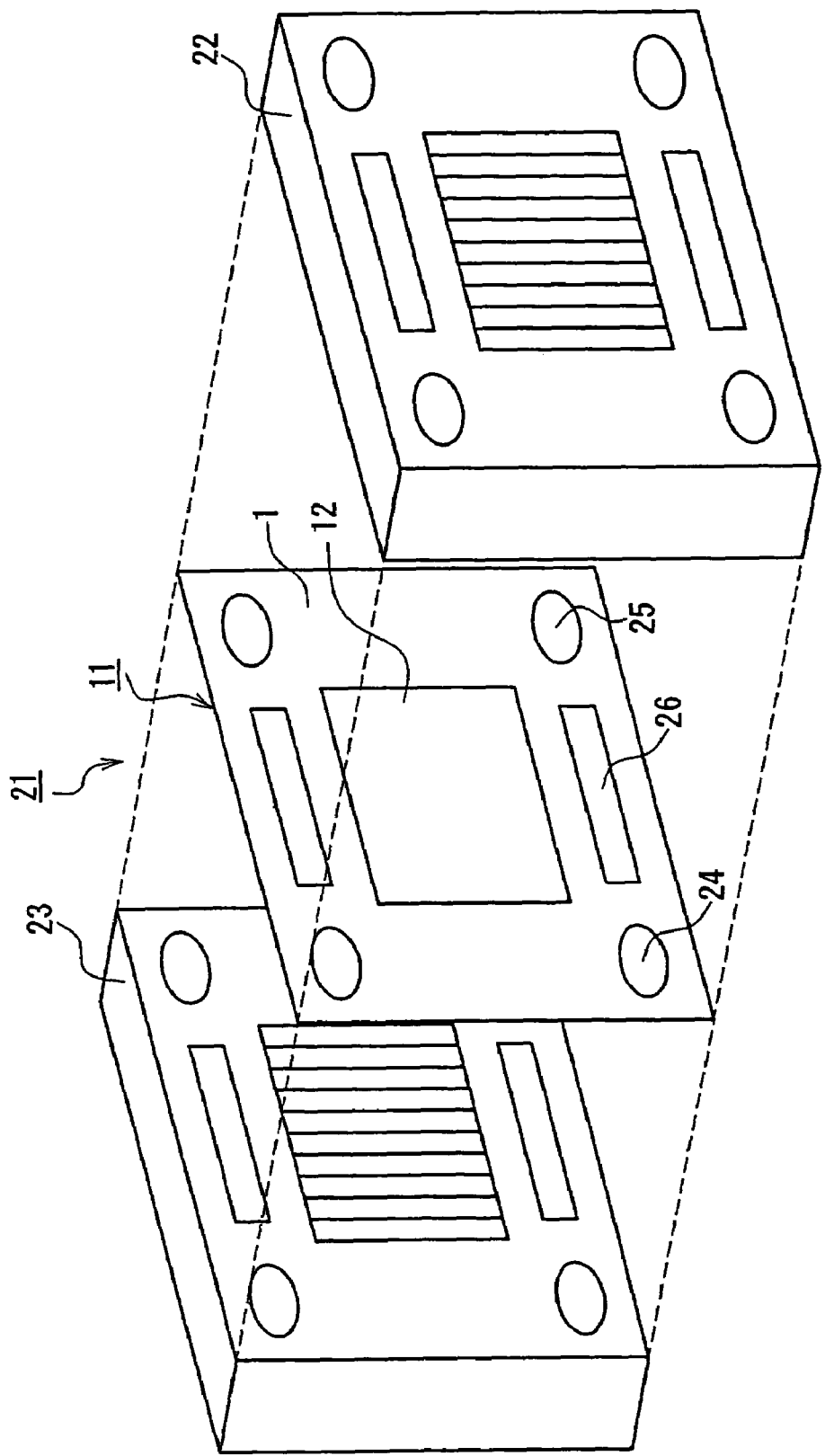
FIG. 18 is a schematic view showing an example of a fuel cell of the present invention.

A fuel cell 21 shown in FIG. 18 includes the electrolyte membrane 1 of the present invention described above, the cathode electrode 12 and the anode electrode, wherein the electrolyte membrane 1 is sandwiched between the anode electrode and the cathode electrode 12, and includes a fuel supply portion that supplies fuel to the anode electrode, and an oxidizing agent supply portion that supplies an oxidizing agent to the cathode electrode. Furthermore, in the fuel cell 21 shown in FIG. 18, the MEA 11 that includes the anode electrode, the electrolyte membrane 1 and the cathode electrode 12 is sandwiched by a cathode separator 22 and an anode separator 23. Furthermore, a fuel supply manfold 24, an oxidizing agent supply manifold 25 and a refrigerant supply manifold 26 are formed in the MEA 11. If the fuel cell is air cooled, then the refrigerant manifold is not necessary. Furthermore, it is not necessary that the fuel supply manifold and the oxidizing agent supply manifold be formed in the MEA 11.

In such a fuel cell, since the electrolyte membrane of the present invention is used, it is possible to provide a fuel cell that has superior characteristics (for example, characteristics such as superior electricity generation, suppression of crossover of fuel, and lower cost).

There is no particular limitation on the materials used in the parts other than the electrolyte membrane, or their structure, for example. They can be similar to those of a regular fuel cell (such as PEFC, or direct methanol fuel cell (DMFC)). For example, the anode electrode and the cathode electrode may use Pt as the catalyst, and powdered carbon material may be included as a conducting agent. The electrolyte membrane and the electrodes may be pressed together, for example, in a press, for example. Furthermore, the fuel that is used may be similar, and it is sufficient that it is a fuel that includes, for example, at least one type of gas or liquid selected from hydrogen and hydrocarbons. More specifically, methanol, or an aqueous solution of methanol, for example, may be used. If the fuel is a liquid, then the fuel cell may be supplied with fuel from, for example, a cartridge or the like.

WORKING EXAMPLES

The present invention is explained in further detail below using working examples. It should be noted that the present invention is not limited by the working examples shown below.

Working Example 1

In working example 1, porous particles are used as a base material, and four types of samples with different structures of the organic molecule have been prepared.

The samples of working example 1 are fabricated as follows.

Sample 1

Silica gel was used as the base material (specific area 300 $m^2/cm^3$, average particle diameter 2 μm). Formation of the organic molecule membrane on the surface of the base material was performed as follows.

First, 1.6 g of an alkoxysilane compound ($CH_2(-O-)CHCH_2O(CH_2)_3Si(OCH_3)_3$) containing an epoxy group in a terminal position of the molecular chain was dissolved in 40 cc of toluene solvent, and 1 g of silica gel was dipped in this solution and reacted at 70° C. for 2 hours.

Figure 19:
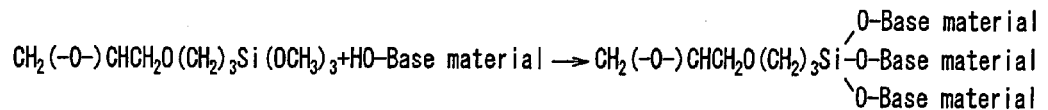
FIG. 19 is a diagram for describing an organic layer formed in a working example.

By this step, a de-alcoholization reaction occurred between the hydroxy groups (—OH) on the surface of the base material and the alkoxy groups of the alcoxysilane compound, and an organic layer could be formed from the organic molecules that are covalently bonded with the surface of the base material. It seems that the de-alcoholization reaction progresses as in the chemical reaction shown in FIG. 19. It should be noted that in the chemical reaction shown in FIG. 19, "base material" has been written a plurality of times on the right, however this does not necessarily mean that the organic molecule is covalently bonded to a plurality of base materials. The organic molecule has 3 bonds between it and the base material because it contains Si, however it can bond with a single base material. Furthermore, the by-product water is omitted. This is also shown in a similar manner in the drawings to follow.

Figure 20:
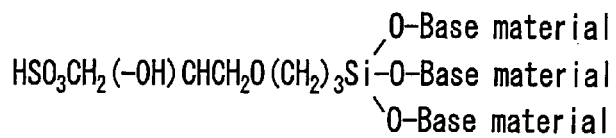
FIG. 20 is a diagram for describing an organic layer formed in a working example.

Next, a functional group having ionic conductivity was provided for the organic molecules that are covalently bonded to the surface of the base material. A sulfone group was used as the functional group. The provision of the functional group was performed by the following procedure. 3.0 g of sodium sulfite was dissolved in 30 cc of water, and 1 g of the foregoing silica gel was dipped in the solution thereof, and reacted at 70° C. for 2 hours. By this reaction, an organic layer could be formed from organic molecules into which sulfone groups (FIG. 20), which are ion exchange groups, were introduced (however the base material in FIG. 20 is not included in the organic molecule, likewise with the following.) It should be noted that the molecular weight of the organic molecule shown in FIG. 20 is 273; and the thickness of the organic molecule membrane is 0.3 nm. The thickness of the organic molecule was obtained by measuring the fine hole distribution of the silica gel before processing, and that of the silica gel on which the organic layer is formed, and then comparing the average values of the fine hole diameters. It should be noted that measurement of the fine hole distribution was performed by nitrogen adsorption, and that the fine hole distribution and the average fine hole diameter were obtained by analysis of nitrogen gas adsorption isotherms by the BJH method.

After mixing in a mortar the silica gel on which the organic layer was formed, fabricated in the foregoing manner, with a mass of 10 wt % of the silica gel of polytetrafluoroethylene (PTFE) powder, an electrolyte membrane (diameter 20 mm, thickness 200 μm) was obtained by pellet molding the mixture at 5 MPa (50 $kgf/cm^2$) pressure.

Sample 2

Using the same base material as in sample 1, and using a different organic molecule as in sample 1, an organic layer was formed on the base material. Application of the organic layer onto the surface of the base material was carried out as below.

First, 1.6 g of a chlorosilane compound ($CH_2=CH-C_6H_4-(CH_2)_3SiCl_3$) containing a benzene ring within the molecule was dissolved in 40 cc of toluene solvent, and 1 g of silica gel was dipped in this solution and reacted at room temperature for 2 hours.

Figure 21:
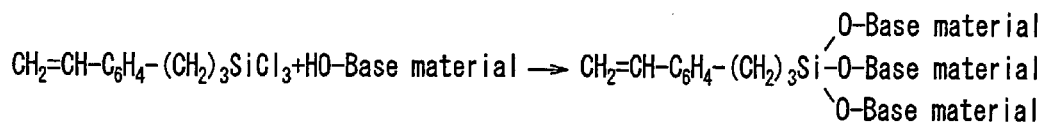
FIG. 21 is a diagram for describing an organic layer formed in a working example.

By this step, a dehydrochlorination reaction occurs between the hydroxy groups (—OH) on the surface of the base material and the chloro groups of the chlorosilane compound, and a layer was formed from the organic molecules covalently bonded with the surface of the base material. It seems that the dehydrochlorination reaction progresses by the chemical reaction shown in FIG. 21.

Figure 22:
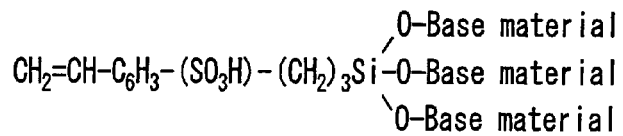
FIG. 22 is a diagram for describing an organic layer formed in a working example.

Next, a functional group having ionic conductivity was added to the organic molecules covalently bonded to the surface of the base material. A sulfone group was used as the functional group. Insertion of the functional groups was performed by the following procedure. 10 cc of chlorosulfuric acid and 30 cc of chloroform were mixed, and 1 g of the above-mentioned silica gel was dipped in this solution and reacted at 40° C. for 4 hours. By this reaction, an organic layer made from organic molecules in which sulfone groups (ion exchange groups) are introduced could be formed (FIG. 22). It should be noted that the molecular weight of the organic molecule shown in FIG. 22 is 301, and the thickness of the organic molecule membrane is 0.3 nm. The membrane thickness was measured in a similar manner to that of sample 1.

The silica gel fabricated in the foregoing manner in which the organic layer was formed, was processed in a similar manner to that of sample 1 and the electrolyte membrane was obtained.

Sample 3

Using the same base material as in sample 1, and using a different organic molecule as in sample 1, an organic molecule membrane was formed on the base material. Application of the organic layer onto the surface of the base material was carried out as below.

First, 1.6 g of a chlorosilane compound ($CH_2$=CH—$C_6H_4$—$(CH_2)_3SiCl_3$) containing a benzene ring within the molecule was dissolved in 40 cc of toluene solvent, and 1 g of silica gel was dipped in this solution and reacted at room temperature for 2 hours.

By this step, a dehydrochlorination reaction occurs between the hydroxy groups (—OH) on the surface of the base material and the chloro groups of the chlorosilane compound, thus forming a layer from the organic molecules covalently bonded with the surface of the base material. It seems that the dehydrochlorination reaction progresses by the chemical reaction shown in FIG. 23.

Since this organic molecule contains a double bond, being a type of bonding group, at the end of its principal chain, it is possible to stack organic compounds on it.

Figure 24:
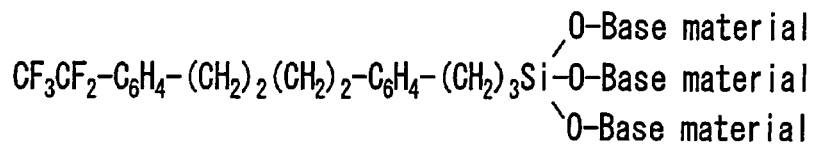
FIG. 24 is a diagram for describing an organic layer formed in a working example.

Layering of the organic molecules was performed as follows. The silica gel fabricated in the manner described above in which the layer made of organic molecules is formed, is dipped in a solution that includes 1.6 g of the organic molecule ($CF_3CF_2$—$C_6H_4$—$(CH_2)_2Br$) to be laminated, 40 cc of toluene solvent, and also 0.4 g of azoisobutylnitryl (AIBN) as a bonding starter agent, and was reacted at 60° C. for 2 hours. By this step of laminating, the organic molecules covalently bonded to the surface of the base material are as shown in FIG. 24.

Figure 25:
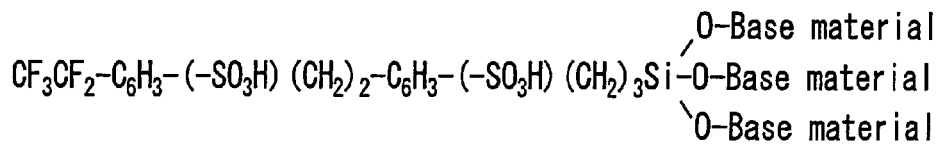
FIG. 25 is a diagram for describing an organic layer formed in a working example.

Next, functional groups having ionic conductivity were added to the organic molecules covalently bonded to the surface of the base material. Sulfone groups were used as the functional groups. Application of the functional groups was performed in a similar manner to that of sample 2. By this reaction, an organic layer made from organic molecules in which sulfone groups, being ion exchange groups, are introduced could be formed (FIG. 25). It should be noted that the molecular weight of the organic molecule shown in FIG. 25 is 605, and the thickness of the organic layer is 0.6 nm. The layer thickness was measured in a similar manner to that of sample 1.

The silica gel fabricated in the foregoing manner in which the organic layer was formed was processed in a similar manner to that of sample 1, and the electrolyte membrane was obtained.

Sample 4

Using the same base material as in sample 1, and using a different organic molecule as in sample 1, an organic layer was formed on the base material. Application of the organic layer onto the surface of the base material was carried out as below.

Figure 26:
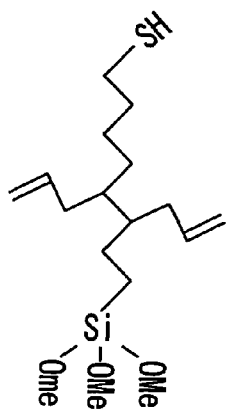
FIG. 26 is a diagram for describing an organic layer used in a working example.

First, 1.6 g of an alkoxysilane compound (HS—$(CH_2)_4$—CH(—$CH_2$—CH=$CH_2$)—CH(—$CH_2$—CH=$CH_2$)—$(CH_2)_2Si$—$(OMe)_3$) containing double bonds within the molecule was dissolved in 40 cc of toluene solvent, and 1 g of silica gel was dipped in this solution and reacted at 60° C. for 2 hours. This alkoxysilane compound is shown in FIG. 26. It should be noted that "Me", including the "Me" shown in FIG. 26 means a methyl group (—$CH_3$).

Figure 27:
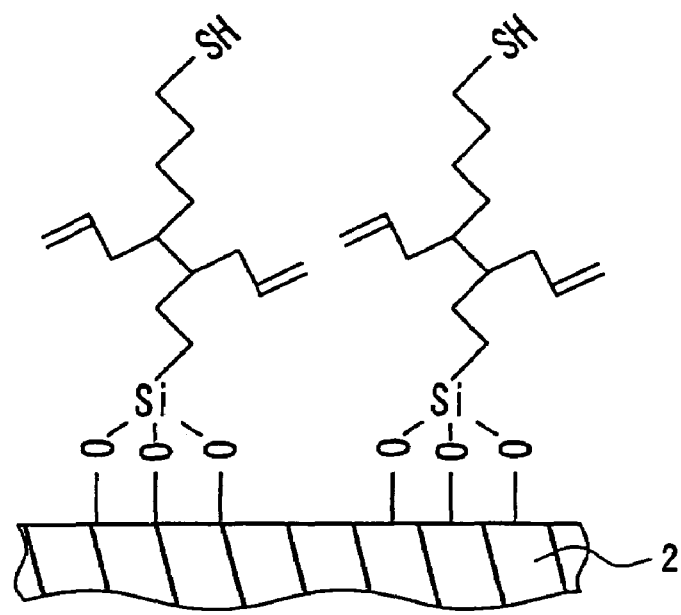
FIG. 27 is a diagram for describing an organic layer formed in a working example.

By this step, a de-alcoholization reaction occurs between the hydroxy groups (—OH) on the surface of the base material and the alkoxy groups of the alkoxysilane compound, thus forming a membrane (a part of which is shown in FIG. 27) from the organic molecules covalently bonded with the surface of the base material 2.

Since the organic compound contains double bonds, being a type of bonding group on side chains, bonds may be formed with adjacent organic molecules.

Figure 28:
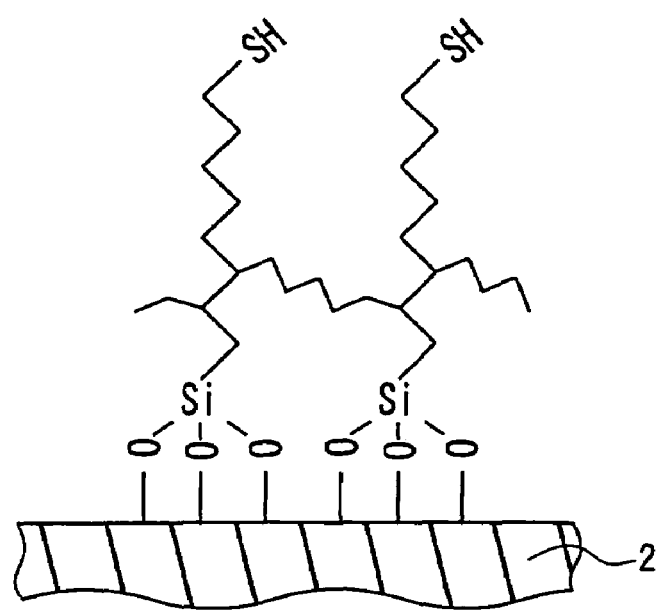
FIG. 28 is a diagram for describing an organic layer formed in a working example.

Bonding between adjacent organic molecules was carried out as follows. 1 g of silica gel fabricated as described above in which a layer made of organic molecules, was dipped in a 40 cc solution of toluene solvent containing 0.4 g of AIBN as a bonding starter agent, and reacted at 60° C. for 2 hours. By this reaction, bonds were formed between adjacent organic molecules, and a membrane as shown in FIG. 28 was formed on the surface of the base material 2.

Figure 29:
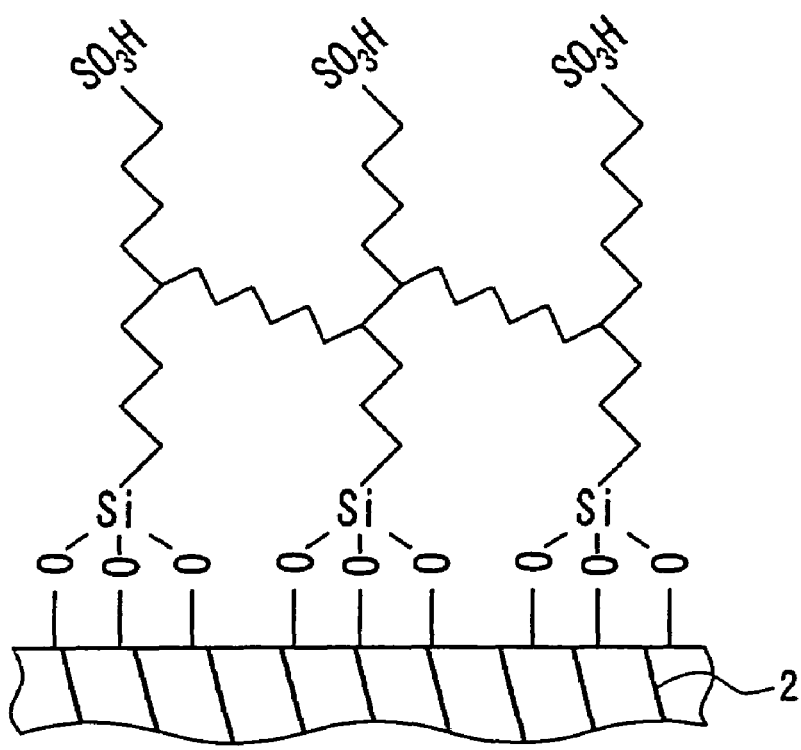
FIG. 29 is a diagram for describing an organic layer formed in a working example.

Next, functional groups having ionic conductivity were added to the organic molecules covalently bonded to the surface of the base material. A sulfone group was used as the functional group. The functional group was applied by the procedure described below. 1 g of the foregoing silica gel was dipped in 30 cc of 30 wt % hydrogen peroxide solution, and reacted at 60° C. for 2 hours. By this reaction, an organic layer made from organic molecules in which sulfone groups, being ion exchange groups, are introduced could be formed (one part of which is shown in FIG. 29). It should be noted that the thickness of the organic layer shown in FIG. 29 is 0.3 nm. The layer thickness was measured in a similar manner to that of sample 1.

The silica gel fabricated in the foregoing manner in which the organic layer was formed, was processed in a similar manner to that of sample 1 to obtain the electrolyte membrane.

COMPARATIVE EXAMPLE 1

For the purpose of comparison, an electrolyte membrane, Du Pont's Nafion 117, was used in working example 1. Properties such as membrane thickness are similar to those of sample 1.

The ionic conductivity of sample 1 to sample 4 and comparative example 1, fabricated in this way, were evaluated. Evaluation of ionic conductivity was performed by sandwiching two sheets of the sample electrolyte membrane between gold electrodes, placing them in a constant temperature constant humidity bath at 100% humidity, and measuring their AC impedance. The results are shown in Table 1.

TABLE 1

| Sample No. | Ionic conductivity (S/cm) |
| --- | --- |
| 1 | 0.12 |
| 2 | 0.13 |
| 3 | 0.22 |
| 4 | 0.10 |
| Comparative example 1 | 0.07 |

As shown in Table 1, the result is that samples 1 to 4 have ionic conductivity that is superior to that of comparative example 1. This seems to be because samples 1 to 4 have a high density of functional groups with ionic conductivity that are orderly disposed, and an organic molecule membrane that is the path of ionic conductance.

Furthermore, of the samples 1 to 4, sample 3 had the highest ionic conductivity. It is thought that this is because the organic layer included in sample 3 was a bi-layer, and this had the most ion exchange groups.

Working Example 2

The working example 2 includes the same organic layer as in the foregoing sample 1, however 6 types of sample, each having different base material, were prepared.

The samples according to working example 2 were prepared in the following manner. It should be noted that the average diameter of the through holes of the base material was measured by nitrogen adsorption, in a similar manner to that of working example 1. This is also the case in the following working examples.

Sample 5

Uniaxially pierced silica glass (specific surface area 200 m$^2$/cm$^3$, average through hole diameter 4 nm, thickness 500 μm), which is a porous membrane in which the through holes are present only in the direction perpendicular to the membrane surface, was used as the base material. The size of the silica glass was a square 3 cm by 3 cm. An organic membrane was formed on the surface of such a base material by a method similar to that for sample 1, and an electrolyte membrane was fabricated.

Sample 6

Porous silica glass (specific surface area 200 m$^2$/cm$^3$, average through hole diameter 4 nm, thickness 500 μm), which is a porous membrane in which the through holes are present in a three dimensional net-shape, was used as the base material. The size of the silica glass was 3 cm square. Onto the surface of such a base material, an organic membrane was formed by a method similar to that for sample 1, and an electrolyte membrane was fabricated.

Sample 7

Figure 30:
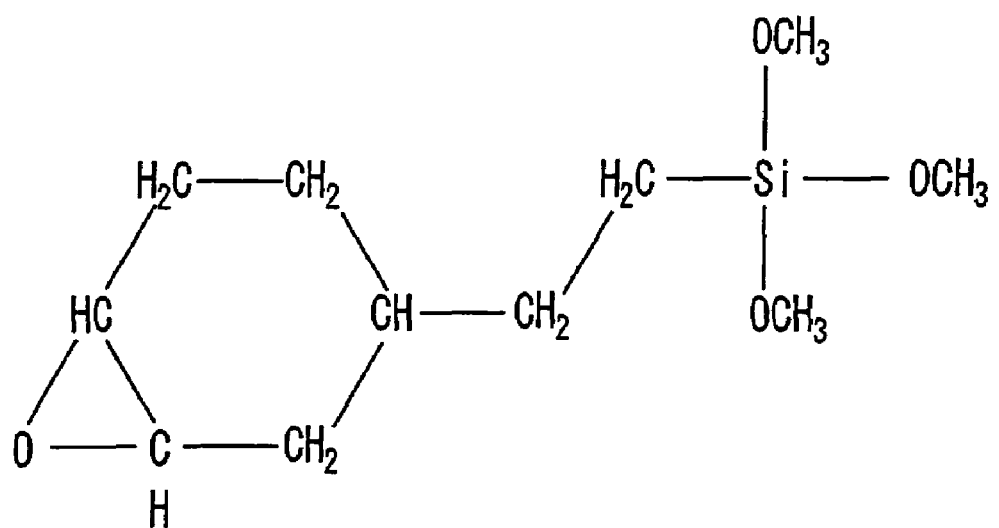
FIG. 30 is a diagram for describing a precursor used in a working example.

An electrolyte material having a thickness of 1 mm was fabricated by laminating sample 5 and sample 6. It should be noted that a toluene solution containing 50 wt % methoxysilane compound, being an organic molecule having thermal polymerization properties, was cast and dried onto a surface of one sample, after which the samples were joined together by layering and heating to 80° C., to form a laminate. The compound shown in FIG. 30 was used as the methoxysilane compound.

Sample 8

The uniaxially pierced silica glass used in sample 5 (having a thickness of 50 μm) was laminated onto the porous silica glass used in sample 6 (thickness 500 μm) to obtain a composite silica glass. Using the composite silica glass as the base material, an organic layer was formed using the same method similar as in sample 1, and an electrolyte membrane was fabricated.

Sample 9

A polyester film having a thickness of 1 μm was used as the base material. First, the film was cut with a slitter into a belt having a width of 5 mm and a length of 100 mm. Next, an organic layer was formed on the surface of the belt shaped base material using the same method as that of sample 1. Next, ten pieces of the base material on which the organic membrane is formed were layered as a sheet, and a glass rod having a diameter of 1 mm was used as an axle (winding core) to wind up the sheet around the axle. During winding, a high precision winding device was used, and the axle was rotated at low speed while keeping the base material under tension.

In this manner, a very fine electrolyte membrane having a diameter of 11.4 mm was obtained. Ten pieces of an electrolyte membrane having a thickness of 500 μm were obtained by cutting this in a direction perpendicular to the axle with a slitter. Moreover, a part of the electrolyte membrane so obtained was cut, so as not to include the axle, into squares 5 mm by 5 mm (thickness 500 μm).

Sample 10

The silica gel fabricated in sample 1 on which the organic layer was formed, was mixed in a mortar with an aqueous solution of 10 wt % polyvinyl alcohol. This was then suction filtered to retain it within a porous glass having an average fine hole diameter of 20 μm and a thickness of 500 μm, to fix it, and to provide the electrolyte membrane.

The ionic conductivity of samples 5 to 10 fabricated in this way was then evaluated. The ionic conductivities were evaluated in a similar manner to those of working example 1. The results are shown in Table 2 along with that of comparative example 1.

TABLE 2

| Sample No. | Ionic conductivity (S/cm) |
|---|---|
| 5 | 0.16 |
| 6 | 0.10 |
| 7 | 0.14 |
| 8 | 0.11 |
| 9 | 0.0015 |
| 10 | 0.08 |
| Comparative example 1 | 0.07 |

As shown in Table 2, apart from sample 9, the ionic conductivity of the samples is higher than that of the comparative example 1. Of these, the highest was the ionic conductivity of sample 5, which used a base material having through holes only in the direction perpendicular to the membrane surface. However, provided that the base material has holes in a direction that at least pierces the electrolyte membrane, as in sample 6, it is possible to obtain high ionic conductivity. Furthermore, sample 7 and sample 8 show an ionic conductivity between the value of the ionic conductivity of sample 5 and sample 6. Thus, it has been found that by freely combining electrolyte membranes, and by providing a composite body of desired base materials as the base material, it is possible to control the ionic conductivity.

The ionic conductivity of sample 9 has a value lower than that of the comparative example 1, however it was found that even if there are no fine pores, and even if the base material is an organic material, ionic conductivity could be obtained, and an electrolyte membrane could be obtained. It seems that if conditions such as the type of organic layer, and the thickness could be optimized, then a larger ionic conductance could be realized.

Furthermore, as in sample 10, even when the base material in which the organic membrane is formed is contained within a porous membrane, it was possible to obtain an electrolyte membrane having superior ionic conductivity. Even if, for example, an organic film, (such as porous polyethylene) is used as the porous membrane, a similar result may be obtained. Furthermore, if an organic film is used as the porous membrane, it is possible to provide a more flexible electrolyte membrane.

Working Example 3

In working example 3, five samples, which include the same organic layer as in the foregoing sample 1, but in which the specific surface area per unit area has been changed, were prepared.

The samples of working example 3 are fabricated as follows. It should be noted that measurement of the porosity ε of the base materials was by nitrogen adsorption. The following working examples also were measured in a similar manner.

Sample 11

A porous alumina membrane containing through holes (specific surface area 310 m²/cm³, average through hole diameter 3 nm, thickness 50 μm and porosity 24%) was used as the base material. An organic layer was formed onto the surface of such a base material using the same method used for sample 1, and an electrolyte membrane was fabricated.

Sample 12

A porous alumina membrane containing through holes (specific surface area 190 m²/cm³, average through hole diameter 5 nm, thickness 50 μm and porosity 24%) was used as the base material. An organic layer was formed onto the surface of such a base material using the same method used for sample 1, and an electrolyte membrane was fabricated.

Sample 13

A porous alumina membrane containing through holes (specific surface area 100 m²/cm³, average through hole diameter 9 nm, thickness 50 μm and porosity 25%) was used as the base material. An organic layer was formed onto the surface of such a base material using the same method used for sample 1, and an electrolyte membrane was fabricated.

Sample 14

A porous alumina membrane containing through holes (specific surface area 70 m²/cm³, average through hole diameter 10 nm, thickness 50 μm and porosity 25%) was used as the base material. An organic layer was formed onto the surface of such a base material using the same method used for sample 1, and an electrolyte membrane was fabricated.

Sample 15

A porous alumina membrane containing through holes (specific surface area 50 m²/cm³, average through hole diameter 20 nm, thickness 50 μm and porosity 23%) was used as the base material. An organic layer was formed onto the surface of such a base material using the same method used for sample 1, and an electrolyte membrane was fabricated.

The ionic conductance of sample 11 to sample 15 fabricated in this manner was evaluated. The ionic conductivities were evaluated in a similar manner to working example 1. The results are shown in Table 2 along with that of comparative example 1. Furthermore, the value of $(4\times\epsilon)/d$ of each sample is also shown at the same time ($\epsilon$ is the porosity of the base material, d is the average diameter of the through holes.)

TABLE 3

| Sample No. | Specific surface area (m²/cm³) | 4 ε/d | Ionic conductivity (S/cm) |
|---|---|---|---|
| 11 | 310 | 32 | 0.23 |
| 12 | 190 | 19 | 0.16 |
| 13 | 100 | 11 | 0.09 |
| 14 | 70 | 9.6 | 0.06 |
| 15 | 50 | 4.8 | 0.01 |
| Comparative example 1 | — | — | 0.07 |

As shown in Table 3, ionic conductivity was obtained in all samples from sample 11 to sample 15. However, within these, a trend was obtained in that the larger the specific surface area, the larger the ionic conductivity that was achieved. In particular, in the range in which the specific surface area is at least 70 m²/cm³, or in the range in which the parameter $(4\times\epsilon/d)$ is approximately at least 10, the result was that the ionic conductivity was substantially equal to or greater than that of the first comparative example.

Working Example 4

In working example 4, 13 samples were prepared, including the same organic layer as in the foregoing sample 1, but in which the specific surface area per unit area and the average path curvature of the through holes τ has been altered. It should be noted that average path curvature τ of the base material is estimated by the air permeability of the base material. Air permeability is defined as the time taken for a given volume of gas to pass through a given area of sample under given conditions. Air permeability is dependent on factors such as the moving velocity of the gas and the shape of the through holes. More specifically, the air permeability t (sec) is expressed in the following formula, whereby l is the foregoing thickness (cm), $\epsilon$ is porosity (volume %), τ is the average tortuosity, d is the average hole diameter, and C is a proportionality coefficient:

$$t = C \cdot (\tau^2 \times l)/(\epsilon \times d)$$

That is to say, by determining the air permeability of the base material, it is possible to determine the average tortuosity τ.

In the present working example, when the average tortuosity is calculated, the parameters of the foregoing formula were measured as below. Measurement of air permeability was in accordance with ASTM standard (American Society for Testing and Materials), and was carried out under the conditions of 10 cm³ of permeating gas volume, sample area 1 inch², and applied pressure of 2.3 cmHg. Porosity $\epsilon$ and average hole diameter d were measured by analysis in accordance with nitrogen adsorption and the BJH method in the same manner as the working examples up to this point. The proportionality coefficient was set to 0.52. The method of calculating the average tortuosity τ is the same as that performed in the working examples to follow.

The samples of working example 4 were fabricated in the following manner.

Sample 16

A porous silica membrane containing through holes (average through hole diameter 4 nm, average tortuosity 1.2, porosity 25% and thickness 50 μm) was used as the base material. An organic layer was formed onto the surface of such a base material using the same method used for sample 1, and an electrolyte membrane was fabricated.

A similar electrolyte membrane was fabricated in the samples 17 to 28 shown below. However, the base material given below was used for the base material.

Sample 17

A porous silica membrane containing through holes (average through hole diameter 4 nm, average tortuosity 1.2, porosity 31% and thickness 50 μm).

Sample 18

A porous silica membrane containing through holes (average through hole diameter 4 nm, average tortuosity 1.2, porosity 42% and thickness 50

Sample 19

A porous silica membrane containing through holes (average through hole diameter 4 nm, average tortuosity 1.2, porosity 57% and thickness 50 μm).

Sample 20

A porous silica membrane containing through holes (average through hole diameter 4 nm, average tortuosity 1.6, porosity 21% and thickness 50 μm).

Sample 21

A porous silica membrane containing through holes (average through hole diameter 4 nm, average tortuosity 1.6, porosity 27% and thickness 50 μm).

Sample 22

A porous silica membrane containing through holes (average through hole diameter 4 nm, average tortuosity 1.6, porosity 50% and thickness 50 μm).

Sample 23

A porous silica membrane containing through holes (average through hole diameter 4 nm, average tortuosity 1.6, porosity 60% and thickness 50 μm).

Sample 24

A porous silica membrane containing through holes (average through hole diameter 4 nm, average tortuosity 1.6, porosity 69% and thickness 50 μm).

the electrolyte membrane, such that when matter is introduced into the glass tube, that matter is in contact with the surface of the electrolyte membrane. Next, an aqueous solution of alcohol of 50 mol % concentration was introduced into one glass tube, and water was introduced into the other glass tube. The concentration of alcohol in the glass tube in which water was introduced was measured at constant time intervals to calculate the permeability rate (mol/cm$^2$/s) of alcohol. Next, the permeability was standardized to the concentration of the alcohol solution that was used, and the thickness of the electrolyte membrane, and thus the alcohol permeability coefficient (cm$^2$/s) was determined. It can be said that the smaller the alcohol permeability coefficient, the greater the electrolyte membrane is able to suppress cross-over of fuel. It should be noted that in the present working example, methanol was used as the alcohol.

The results are shown in Table 4.

TABLE 4

| Sample No. | Average tortuosity $\tau$ | Porosity $\epsilon$ (volume %) | $\epsilon/\tau^2$ | Alcohol permeability coefficient × $10^{-7}$ (cm$^2$/s) | Ionic conductivity (S/cm) |
| --- | --- | --- | --- | --- | --- |
| 16 | 1.2 | 18 | 13 | 19.8 | 0.16 |
| 17 | 1.2 | 24 | 17 | 26.9 | 0.19 |
| 18 | 1.2 | 35 | 24 | 39.1 | 0.20 |
| 19 | 1.2 | 50 | 35 | 57.0 | 0.40 |
| 20 | 1.6 | 14 | 5.5 | 6.3 | 0.07 |
| 21 | 1.6 | 20 | 7.8 | 12.0 | 0.1 |
| 22 | 1.6 | 43 | 17 | 25.0 | 0.19 |
| 23 | 1.6 | 53 | 21 | 35.1 | 0.25 |
| 24 | 1.6 | 62 | 24 | 40.2 | 0.35 |
| 25 | 1.8 | 16 | 4.9 | 6.2 | 0.07 |
| 26 | 1.8 | 24 | 7.4 | 12.1 | 0.1 |
| 27 | 1.8 | 56 | 17 | 27.0 | 0.36 |
| 28 | 1.8 | 75 | 23 | 39.0 | 0.46 |
| comparative example 1 | — | — | — | 30.3 | 0.07 |

Sample 25

A porous silica membrane containing through holes (average through hole diameter 4 nm, average tortuosity 1.8, porosity 23% and thickness 50 μm).

Sample 26

A porous silica membrane containing through holes (average through hole diameter 4 nm, average tortuosity 1.8, porosity 31% and thickness 50 μm).

Sample 27

A porous silica membrane containing through holes (average through hole diameter 4 nm, average tortuosity 1.8, porosity 63% and thickness 50 μm).

Sample 28

A porous silica membrane containing through holes (average through hole diameter 4 nm, average tortuosity 1.8, porosity 82% and thickness 50 μm).

The ionic conductivity and alcohol permeability of sample 16 to sample 28 fabricated in this manner were evaluated. The ionic conductivity was evaluated in a similar manner to that in working example 1. The alcohol permeability of the electrolyte membrane was evaluated using the following procedure. First, the electrolyte membrane was sandwiched between two glass tubes. At this time, the ends of the glass tubes were arranged such that they were in contact with the surfaces of As shown in Table 4, an ionic conductivity equal to or greater than that of comparative example 1 could be achieved in all the samples 16 to 28. Furthermore, in samples in which the parameter $\epsilon/\tau^2$ was less than or equal to 20, the permeability coefficient of methanol was smaller than that of the comparative example 1, that is, the electrolyte membranes were able to suppress cross-over of fuel.

It should be noted that the structure of the organic layer in all samples was the same in working example 4, however it is also possible to obtain a similar result even if the structure of the organic layer is changed. That is to say, it seems that there is a relationship between the alcohol permeability coefficient of the electrolyte membrane and the parameter ($\epsilon/\tau^2$). It should be noted that the result of the working example 4 does not eliminate the possibility that there may be a correlation between the alcohol permeability coefficient of the electrolyte membrane and a parameter of the electrolyte membrane other than those described above.

Working Example 5

In working example 5, a sample was prepared in which matter was disposed so as to fill the gaps present in the inner portion of the through holes of the sample 19 of working example 4.

Sample 29

Figure 23:
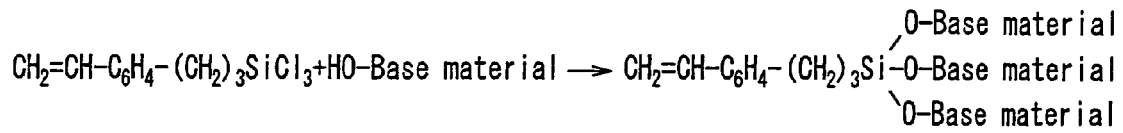
FIG. 23 is a diagram for describing an organic layer formed in a working example.

By dipping sample 19 into a solution of toluene solvent containing 10 wt % of a methoxysilane compound, which is an organic molecule having thermal polymerizability, as a precursor, and reacting it at 80° C. for 5 hours, the gaps in the inner portion of the through holes were filled. It should be noted that the structural formula of the methoxysilane compound, being the precursor, is shown in FIG. 23. It should be noted that from the result of specific surface area measurement by nitrogen adsorption, the electrolyte membrane obtained was substantially non-porous. Here, "non-porous" means that there are no holes, such as gaps and pores, of a size that is at least equal to or greater than the measurement limit (average hole diameter 0.5 nm) obtainable by the nitrogen adsorption method.

The results of measuring the alcohol permeability coefficient and the ionic conductivity of the sample 29 are shown below. The measurements were in accordance with the measuring methods of working example 4 and working example 1, respectively.

TABLE 5

| Sample No. | Alcohol permeability coefficient × $10^{-7}$ ($cm^2/s$) | Ionic conductivity (S/cm) |
| --- | --- | --- |
| 29 | 0.02 | 0.26 |
| Comparative example 1 | 30.3 | 0.07 |

As shown in Table 5, the ionic conductivity of sample 29 was estimated to be larger than that of comparative example 1. Furthermore, the alcohol permeability coefficient was much lower than that of sample 19. Thus it was possible to obtain an electrolyte membrane in which cross-over of fuel is suppressed further by further disposing matter so as to fill the gaps present in the internal portion of the through holes.

Working Example 6

In working example 6, a fuel cell was fabricated using the electrolyte membrane fabricated in working example 3, and electricity production characteristics were evaluated.

Sample 30

A fuel cell was fabricated using the sample 11. The method for fabricating the fuel cell is described below. First, an MEA was fabricated by arranging an anode electrode and a cathode electrode on both sides of the electrolyte membrane so as to hold the electrolyte membrane. Next, the fuel cell was fabricated by disposing a carbon separator in which flow channels are formed through which fuel and air flow respectively, so as to further hold the MEA. A catalyst paste that is a mixture of a carbon catalyst supporting a PtRu catalyst (manufactured by Tanaka Precious Metal Co. as TEC61E54) and a hydrogen ion conductive macromolecular electrolyte solution (manufactured by Asahi Glass Corporation as Flemion) coated onto a carbon sheet (manufactured by Toray Corporation as TGPH060H) and dried, was used as the anode electrode. For the cathode electrode, a catalyst paste that is a mixture of a carbon catalyst supporting a Pt catalyst (manufactured by Tanaka Precious Metal Co. as TEC10E50E) and a hydrogen ion conductive macromolecular electrolyte solution (manufactured by Asahi Glass Corporation as Flemion) coated onto a carbon sheet (manufactured by Toray Corporation as TGPH060H) and dried, was used. It should be noted that the area of the electricity generating region of the MEA was 4 $cm^2$.

Sample 31

The sample 12 was used as the electrolyte membrane, and a fuel cell fabricated in the same manner as in the sample 30.

Sample 32

The sample 13 was used as the electrolyte membrane, and a fuel cell fabricated in the same manner as in the sample 30.

Sample 33

The sample 14 was used as the electrolyte membrane, and a fuel cell fabricated in the same manner as in the sample 30.

Sample 34

The sample 15 was used as the electrolyte membrane, and a fuel cell fabricated in the same manner as in the sample 30.

Comparative Example 2

The comparative example 1 was used as the electrolyte membrane, and a fuel cell fabricated in the same manner as in the sample 30.

An electricity generating experiment was carried out on the samples 30 to 34 and the comparative example 2 fabricated in this manner. For the electricity generating conditions, hydrogen gas was provided as the fuel (supply rate 30 ml/min, gas temperature 60° C., gas relative humidity 70%) and air as the oxidizing agent (supply rate 200 cc/min, gas temperature 60° C., gas relative humidity 70%), and the temperature of the cell was set to 60° C. The items for evaluation were the samples' open circuit voltage (OCV), the voltage (V) of the battery at a current density of 0.1 A/$cm^2$ and the voltage (V) of the battery at a current density of 0.3 A/$cm^2$. The results are shown in Table 6.

TABLE 6

| Sample No. | OCV (V) | Current density of 0.1 A/$cm^2$ | Current density of 0.3 A/$cm^2$ |
| --- | --- | --- | --- |
| 30 | 0.93 | 0.78 | 0.72 |
| 31 | 0.91 | 0.77 | 0.70 |
| 32 | 0.92 | 0.76 | 0.69 |
| 33 | 0.93 | 0.74 | 0.66 |
| 34 | 0/92 | 0.70 | 0.55 |
| Comparative example 2 | 0.90 | 0.75 | 0.68 |

As shown in Table 6, all the samples from sample 30 to sample 34 were capable of generating electricity. Furthermore, from among these the samples 30 to 33 showed equal or better electricity generation than that of the comparative example 2.

Working Example 7

In working example 7, fuel cells were fabricated using the electrolyte membranes fabricated in the working example 4 and working example 5, and their electricity generating characteristics were evaluated.

Sample 35

The sample 20 was used as the electrolyte membrane, and a fuel cell was fabricated in the same manner as that of sample 30.

Sample 36

The sample 25 was used as the electrolyte membrane, and a fuel cell was fabricated in the same manner as that of sample 30.

Sample 37

The sample 29 was used as the electrolyte membrane, and a fuel cell was fabricated in the same manner as that of sample 30.

Sample 38

Using the sample 29 as the electrolyte membrane, a fuel cell was fabricated in the same manner as that of the sample 30. However, an electrode that includes the silica gel that formed the organic layer used when fabricating the sample 1, was used. The method for forming the electrode is shown below.

First, as described in sample 1, the silica gel that formed the organic layer, and the carbon catalyst that supports PtRu (manufactured by Tanaka Precious Metals Co. as TEC61E54) were mixed in a 1:1 weight ratio. Next, a weight of 5% of the weight of this mixture of PTFE was blended into the mixture in a mortar, and the anode electrode fabricated by pellet molding the mixture at a pressure of 5 MPa (50 kgf/cm$^2$). Furthermore, apart from using a carbon catalyst that supports Pt (manufactured by Tanaka Precious Metals Corporation as TEC10E50E) as the catalyst, the cathode electrodes were fabricated in the same manner as the anode electrodes.

An electricity generation experiment then was carried out on the samples 35 to 38 and the comparative example 2 thus fabricated. For the electricity generating conditions, an aqueous solution of methanol was provided as the fuel (methanol concentration 5 mol/L, supply rate 2 ml/min, fuel temperature 60° C.) and air as the oxidizing agent (supply rate 200 cc/min, gas temperature 60° C., gas relative humidity 50%), and the temperature of the cell was set to 60° C. The items for evaluation were the samples' open circuit voltage (OCV), the voltage (V) of the battery at a current density of 0.1 A/cm$^2$ and the voltage (V) of the battery at a current density of 0.2 A/cm$^2$. The results are shown in Table 7.

TABLE 7

| Sample No. | OCV (V) | Current density of 0.1 A/cm$^2$ | Current density of 0.2 A/cm$^2$ |
|---|---|---|---|
| 35 | 0.75 | 0.45 | 0.32 |
| 36 | 0.75 | 0.46 | 0.28 |
| 37 | 0.88 | 0.50 | 0.38 |
| 38 | 0.89 | 0.54 | 0.44 |
| Comparative example 2 | 0.50 | 0.30 | 0.18 |

As shown in Table 7, it was possible to generate electricity with all the sample from sample 35 to sample 38, using an aqueous solution of methanol as the fuel. Furthermore, all the samples showed electricity generating characteristics superior to those of the comparative example 2. Furthermore, the result was that of these, the electricity generating characteristics of the sample 38, which included the base material in which the organic molecule membrane was formed within its electrodes, was superior.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

As in the foregoing description, the present invention may provide an electrolyte membrane whose configuration is different to that of a conventional electrolyte membrane. Furthermore, it is also possible to provide a fuel cell in which such an electrolyte membrane is used.

It should be noted that in addition to fuel cells, the electrolyte membrane of the present invention also may be used in various electrochemical devices such as primary batteries, secondary batteries, electrochemical capacitors, various gas sensors and electro-chromic elements.

The invention claimed is:

1. An electrolyte membrane having ionic conductivity, the electrolyte membrane comprising:
    a base material, and
    organic molecules containing ion exchange groups;
    wherein the organic molecules are chemically bonded to a surface of the base material to form an organic layer,
    wherein ions are conducted via the ion exchange groups in the organic layer,
    the base material is a porous membrane, wherein a plurality of through holes that pierce the porous membrane in a direction perpendicular to a surface of the porous membrane are formed in the porous membrane,
    the organic molecules are chemically, bonded to an inner surface of the through holes and form the organic layer, and
    in the through holes, a water repellent substance is further provided on a face of the organic layer on a side opposite to a face that is bonded to the base material, and the water-repellent substance fills gaps present in an inner portion of the through holes,
    wherein the water-repellent substance is a polymer of a precursor material of the water-repellent substance polymerized in capillaries that remain in an inner portion of the through hole, and a smallest cross-sectional area of each of the through holes is in a range of 3 nm$^2$ to 300 nm$^2$.

2. The electrolyte membrane according to claim 1, wherein the ion exchange groups include at least one type of functional group selected from phosphonyl, phosphinyl, sulfonyl, sulfinyl, carboxyl, phosphone, phosphine, sulfone, sulfine, mercapto, ether bonding, nitro, hydroxy, quaternary ammonia, amino and phosphoric acid groups.

3. The electrolyte membrane according to claim 1, wherein molecular weight of the organic molecules is 10,000 at most.

4. The electrolyte membrane according to claim 1, wherein the organic molecules are chemically bonded to the surface of the base material by a coupling agent.

5. The electrolyte membrane according to claim 1, wherein at least one of the organic molecules is chemically bonded to an adjacent organic molecule.

6. The electrolyte membrane according to claim 1, wherein a thickness of the organic layer is in a range of at least 0.1 nm to at most 500 nm.

7. The electrolyte membrane according to claim 1, wherein the organic layer is a monolayer.

8. The electrolyte membrane according to claim 1, wherein the organic layer is a bilayer or multilayer that includes a structure in which a plurality of monolayers are built-up.

9. The electrolyte membrane according to claim 1, wherein the base material has at least one form selected from particles or fibres, and wherein the electrolyte membrane includes an amalgamation of the base material.

10. The electrolyte membrane according to claim 1, wherein the base material has a folded film shape.

11. The electrolyte membrane according to claim 10, wherein the surface of the base material and a surface of the electrolyte membrane are perpendicular to each other.

12. The electrolyte membrane according to claim 10, wherein the base material is wound-up.

13. The electrolyte membrane according to claim 10, wherein the base material is folded into an accordion shape.

14. The electrolyte membrane according to claim 1, wherein a cross-sectional area of the through holes that are cut in a direction that is parallel to the surface of the porous membrane changes in a thickness direction of the porous membrane.

15. The electrolyte membrane according to claim 1, wherein fine holes that are connected to the through holes are further formed in the porous membrane, and wherein both ends of the fine holes are open ended.

16. The electrolyte membrane according to claim 15, wherein both ends of the fine holes are connected to the through holes.

17. The electrolyte membrane according to claim 15, wherein one end of the fine holes is connected to the through holes and other end of the fine holes is connected to the surface of the porous membrane.

18. The electrolyte membrane according to claim 1, wherein the base material includes at least one type of material selected from metal, metal oxide, glass, ceramic, clay, carbon, resin and silica.

19. The electrolyte membrane according to claim 18, wherein the base material includes at least one type of material chosen from an oxide of a transition metal, alumina, fluorocarbon resin, aramid resin, silicone resin, amide resin, imide resin and melamine resin.

20. The electrolyte membrane according to claim 1, which includes a plurality of base materials.

21. The electrolyte membrane according to claim 1, wherein the specific surface area per unit volume of base material, measured by gas adsorption method, is at least 100 $m^2/cm^3$.

22. The electrolyte membrane according to claim 1, wherein when porosity of the base material is $\epsilon$ (volume %) and an average diameter of the through holes is d (nm), $\epsilon$ and d satisfy a relationship given by $(4 \times \epsilon)/d > 10$.

23. The electrolyte membrane according to claim 1, wherein when porosity of the base material is $\epsilon$ (volume %), and an average tortuosity of the through holes is $\tau$, $\epsilon$ and $\tau$ satisfy the relationship given by $\epsilon/\tau^2 < 20$.

24. A membrane electrode assembly, comprising:
an electrolyte membrane according to claim 1;
a cathode electrode; and
an anode electrode;
wherein the electrolyte membrane is disposed between the cathode electrode and the anode electrode.

25. A fuel cell, comprising:
an electrolyte membrane according to claim 1;
a cathode electrode; and
an anode electrode;
wherein the electrolyte membrane is held between the cathode electrode and the anode electrode; and further comprising:
a fuel supply portion that supplies fuel to the anode electrode, and an oxidizing agent supply portion that supplies an oxidizing agent to the cathode electrode.

26. The fuel cell according to claim 25, wherein fuel includes at least one type of gas or liquid selected from hydrogen and hydrocarbon.

27. The fuel cell according to claim 26, wherein the fuel includes methanol.

28. The electrolyte membrane according to claim 1, wherein the water-repellent substance comprises a polymer of hydrocarbon molecules or the polymer in which a part of the hydrocarbon molecules is substituted with fluorine.

29. The electrolyte membrane according to claim 1, wherein the precursor of the water-repellent substance comprises at least one selected from the group consisting of styrene, divinylbenzene, methyl methacrylate, and styrene, divinylbenzene, or methyl methacrylate a part of which is substituted with fluorine.

30. The electrolyte membrane according to claim 1, wherein the precursor of the water-repellent substances comprises at least one selected from the group consisting of tetramethoxysilane, tetraethoxysilane, and 3-glycidoxypropyltrimethoxysilane.

* * * * *